(12) United States Patent
Bernaert et al.

(10) Patent No.: US 8,372,456 B2
(45) Date of Patent: Feb. 12, 2013

(54) METHOD FOR PRODUCING A SOLUBLE COCOA PRODUCT FROM COCOA POWDER

(75) Inventors: Herwig Bernaert, Lebbeke-wieze (BE); Ieme Blondeel, Lebbeke-wieze (BE); Dirk De Clercq, Lebbeke-wieze (BE)

(73) Assignee: Barry Callebaut AG, Zurich (CH)

( * ) Notice: Subject to any disclaimer, the term of this patent is extended or adjusted under 35 U.S.C. 154(b) by 604 days.

(21) Appl. No.: 12/447,420

(22) PCT Filed: Nov. 19, 2007

(86) PCT No.: PCT/EP2007/062486
§ 371 (c)(1),
(2), (4) Date: Nov. 30, 2009

(87) PCT Pub. No.: WO2008/059064
PCT Pub. Date: May 22, 2008

(65) Prior Publication Data
US 2012/0003355 A1   Jan. 5, 2012

(30) Foreign Application Priority Data

Nov. 17, 2006  (WO) ................. PCT/EP2006/011050
Jun. 22, 2007  (WO) ................. PCT/EP2007/056258

(51) Int. Cl.
*A23G 1/02* (2006.01)
(52) U.S. Cl. .......................................... 426/45; 426/593
(58) Field of Classification Search .............. 426/45, 426/593
See application file for complete search history.

(56) References Cited

U.S. PATENT DOCUMENTS

| | | | |
|---|---|---|---|
| 2,687,959 A | | 8/1954 | Siehrs |
| 3,615,659 A | | 10/1971 | Weber |
| 3,784,715 A | | 1/1974 | Arden |
| 3,982,042 A | | 9/1976 | Arden |
| 4,776,173 A | * | 10/1988 | Kamarei et al. ................ 62/63 |
| 4,784,866 A | | 11/1988 | Wissgott |
| 4,871,562 A | * | 10/1989 | Terauchi et al. .......... 426/330.3 |
| 5,338,554 A | | 8/1994 | Vogt et al. |
| 7,368,144 B2 | | 5/2008 | Lecoupeau et al. |
| 7,919,135 B2 | | 4/2011 | Nair et al. |
| 2002/0061355 A1 | | 5/2002 | Martin et al. |
| 2004/0202761 A1 | * | 10/2004 | Kochhar et al. .............. 426/534 |
| 2005/0074521 A1 | | 4/2005 | Bartnick et al. |
| 2007/0077318 A1 | | 4/2007 | Pons-Andreu et al. |
| 2008/0038409 A1 | | 2/2008 | Nair et al. |
| 2008/0193629 A1 | | 8/2008 | Pons-Andreu et al. |
| 2010/0130422 A1 | | 5/2010 | Bernaert et al. |
| 2010/0184666 A1 | | 7/2010 | Bernaert et al. |
| 2010/0189829 A1 | | 7/2010 | Bernaert et al. |
| 2011/0293789 A1 | | 12/2011 | Blondeel et al. |

FOREIGN PATENT DOCUMENTS

| | | |
|---|---|---|
| CH | 230897 | 2/1944 |
| CH | 679629 * | 3/1992 |
| CN | 1483472 | 3/2004 |
| DE | 2342177 | 7/1974 |
| GB | 797147 | 6/1958 |
| GB | 2182538 | 5/1987 |
| WO | WO 96/10404 | 4/1996 |
| WO | WO 97/36497 | 10/1997 |
| WO | WO 98/09533 | 3/1998 |
| WO | WO 99/45788 | 9/1999 |
| WO | WO 01/93690 | 12/2001 |
| WO | WO 2007002851 | 1/2007 |
| WO | WO 2008059064 | 5/2008 |
| WO | WO 2009/118418 | 10/2009 |
| WO | WO 2009/133067 | 11/2009 |

OTHER PUBLICATIONS

Scherz H et al., Kakaopulver—Cocoa Powder Cacao en poudre, Food compositions and Nutritional Tables, Jan. 1, 2000, XP 002475567.
BIOSIS abstract, PREV199497494956, XP-002445702; The macronutrient content of fractions from Jerusalem artichoke tubers (Helianthus tuberosus), 1994.
Bonvchi, Investigation of aromatic compounds in roasted cocoa powder, Eur. Food Res. Technol 221:19-29 (2005).
Cacao Et Chocolat—Production Utilisation Caracteristiques, Pontillon (ed), pp. 110-113, 270-273, and 315; Dec. 1997.
Handbuch der Kakaoerzeugnisse, 2nd ed., Fincke (ed.), Springer-Verlag Berlin/Heidelberg/New York, 1965.
Miller et al., Impact of Alkalization on the Antioxidant and Flavanol Content of Commercial Cocoa Powders, J. Agric. Food Chem., 56:8527-8533 (2008). Talcott et al., Red clover isoflavonoids as anthocyanin color enhancing agents in muscadine wine and juice, Food Research International 38(10)-1205-12 (2005).
WPI abstract of CN1483472; XP-002445704, 2004.

* cited by examiner

*Primary Examiner* — D. Lawrence Tarazano
*Assistant Examiner* — Hamid R Badr
(74) *Attorney, Agent, or Firm* — Hoxie & Associates, LLC

(57) ABSTRACT

The present invention relates to a method for producing a soluble cocoa product from cocoa powder comprising the steps: a) preparing an aqueous suspension of cocoa powder (1), b) treating said suspension with one or more degrading enzymes (2), c) submitting (3) the suspension obtained in step b) to a pH treatment comprising treating said suspension for at least 2 hours at a suitable pH, a temperature of at 10 least 100° C., and a pressure which is at least 1 bar higher than the ambient pressure, d) optionally bringing the pH of the suspension obtained in step c) to a pH value corresponding with the pH of the suspension obtained in step a), e) treating (4) the suspension obtained in step c) or d) with one or more degrading enzymes, f) separating (6) the suspension (5) obtained in step e) into insoluble material (8) and a soluble part (7), and g) obtaining soluble cocoa components (10) from the soluble parts (7). The present invention further relates to cocoa products obtained by the present method and use thereof.

16 Claims, 3 Drawing Sheets

METHOD FOR PRODUCING A SOLUBLE COCOA PRODUCT FROM COCOA POWDER

CROSS REFERENCE TO RELATED APPLICATIONS

This application is a US filing under 35 USC 371 of PCT/EP2007/062486 filed on Nov. 19, 2007, which claims the benefit of PCT/EP2006/011050 filed on Nov. 17, 2006, and PCT/EP2007/056258 filed on Jun. 22, 2007, the contents of each of which are incorporated herein by reference.

TECHNICAL FIELD

The present invention relates to a method for producing a soluble cocoa product from cocoa powder. The invention also relates to a soluble cocoa product having improved solubility can be obtained by applying the present method and use thereof, e.g. in a beverage pouch, for preparing a beverage containing cocoa.

BACKGROUND

Cocoa powder is known in the art as the product prepared from cacao nibs, which have been dried and ground after the extraction of cocoa butter. A starting material in the preparation of cocoa powder is cocoa beans which are fermented, dried, roasted and cracked. The nibs—the center of the cocoa bean—are ground into a dark brown paste known as cocoa liquor. This paste is pressed into cocoa cakes by removing most of the cocoa butter. The hard cocoa cakes are ground into cocoa powder. Depending on the amount of cocoa butter earlier removed, the fat content of cocoa powder can be adjusted.

Cocoa powder is used in the preparation of food stuffs such as baked products, beverages, and confectionary. One major use, for example, is in beverages including drinking chocolate, chocolate-flavored milk, and instant drinks from vending machines and other sources. In these applications, ideally the powder should instantly disperse when mixed with a cold aqueous medium such as milk or water. However, cocoa powder is not easily wetted which can impede dispersion and result in lumping. The difficulty is exacerbated if the powder contains fat, such as residual cocoa butter, or if the dispersion is to take place in a cold liquid.

Therefore, processes have been developed for extracting only the soluble elements from the powder. Examples of processes are described in U.S. Pat. No. 3,615,659 and U.S. Pat. No. 5,338,554 which use organic treatment or enzymes.

U.S. Pat. No. 3,615,659 for instance describes a process for producing a chocolate-flavored beverage which comprises the steps of 1) extracting cocoa with water at a temperature of below 80° C., 2) heating the extract to a temperature between 110 and 130° C., 3) subsequent cooling to 20 to 5° C. in order to precipitate insoluble substances, and 4) separating insoluble substances and sterilizing the beverage. The process includes the addition of a starch-degrading enzyme to the cocoa-water mixture in order to increase the yield.

U.S. Pat. No. 5,338,554 discloses a process for producing a soluble cocoa product wherein cocoa powder is subjected to an extraction with alcohol, and from the residue a water extract is prepared. The residue of the alcohol extraction can be subjected to an enzyme treatment in order to increase the subsequent water extraction. This water extract is concentrated to a soluble cocoa product.

A problem with these methods is the large amount of insoluble material still remaining after extraction and a poor taste. Commonly 75% of cocoa powder is found insoluble in water, meaning only 25% of cocoa powder is found as useful soluble components. After enzymatic treatment, the amount of soluble material of the cocoa powder can be increased to about 40%, meaning 40% of the initial cocoa powder is obtained as useful soluble components. However, this remains insufficient for certain applications. Furthermore, the use of organic solvents described in prior art techniques may change the properties and natural taste of the resulting soluble cocoa.

The invention relates to a method for increasing solubilisation of cocoa powder and thus for increasing the amount of soluble cocoa components in a cocoa powder. More in particular, the present invention aims to increase the amount of soluble cocoa components that can be obtained or extracted from a cocoa powder. The present invention also aims to reduce the amount of insoluble material that remains after extraction from cocoa powder. The present invention also aims to provide a more efficient method to render cocoa powder more water soluble.

The present invention further aims to provide cocoa powder having improved solubility together with excellent organoleptic properties and excellent properties, including elevated protein content, a lower theobromine and/or a lower caffeine content relevant for various applications.

SUMMARY OF THE INVENTION

The present invention provides improved methods for producing a soluble cocoa product having improved solubility, organoleptic properties and/or improved properties which are relevant for various applications, e.g. for the preparation of food stuffs such as baked products, beverages, and confectionary.

The present invention is at least in part based on the Applicants' finding that by applying the present method, enzymatic degradation and modification of proteins present in the cocoa beans is improved resulting in a soluble cocoa product having an improved composition and nutritional value.

In particular, the Applicant provides methods for producing a soluble cocoa product having improved solubility and improved properties, including, a lower theobromine and/or a lower caffeine content. The obtained cocoa product advantageously has not only a better taste, but also an increased nutritional value.

In a first aspect, the invention relates to a method for producing a soluble cocoa product from cocoa powder comprising the steps:
 a) preparing an aqueous suspension of cocoa powder (1),
 b) optionally treating said suspension with one or more degrading enzymes (2),
 c) submitting (3) the suspension obtained in step b) to a pH treatment comprising treating said suspension for at least 2 hours at a suitable pH, a temperature of at least 100° C., and a pressure which is at least 1 bar higher than the ambient pressure,
 d) optionally bringing the pH of the suspension obtained in step c) to a pH value corresponding with the pH of the suspension obtained in step a),
 e) treating (4) the suspension obtained in step c) or d) with one or more degrading enzymes,
 f) separating (6) the suspension (5) obtained in step e) into insoluble material (8) and a soluble part (7), and
 g) obtaining soluble cocoa components (10) from the soluble parts (7).

The enzymatic treatment in step b) according to the present method optionally comprises a treatment with one or more starch degrading enzymes, preferably selected from the group comprising amylases and alpha-amylases. The term "starch-degrading enzymes" as used herein refer to enzymes that are capable of degrading starch and/or any degradation products thereof.

The enzymatic treatment in step e) according to the present method preferably comprises the subsequent steps of e1) treating with one or more cell-wall degrading enzymes, and e2) treating with one or more protein degrading enzymes. The term "cell-wall degrading enzymes" as used herein refer to enzymes that are capable of degrading components of the plant cell wall and/or any degradation products thereof. The term "protein degrading enzymes" as used herein refer to enzymes that are capable of degrading proteins and/or any degradation products (e.g. peptides) thereof.

The cell-structures of cocoa are insoluble and difficult to break down, especially after a roasting step in the production of the cocoa powder. As a consequence of the roasting step, proteins and polyphenols are bound to the plant cell-walls, creating thick cell structures. It is difficult to destroy such cell walls physically or enzymatically. Furthermore the application of chemical processes for breaking down the cell-wall structures is in general unwanted in the production of a food-grade product.

The present invention provides a solution to this problem by applying the above-described method. The Applicant provides a method which allows destroying the cocoa cell walls, such that a cell wall is obtained that can be more easily degraded by enzymes. Advantageously the present method does not destroy components of nutritional value contained within the cocoa cells.

In a preferred embodiment, the invention relates to a method wherein said pH treatment comprises treating said suspension for at least 2 hours at a pH of at least 7, and preferably at least 10, a temperature of at least 100° C., and a pressure which is at least 1 bar higher than the ambient pressure.

More in particular, the applicant has shown that it is possible to disentangle the cellulose and pectine-molecules in the cell-wall by increasing the pH, preferably to a pH higher than 7, 8, 9, 10, 11, 12, or 13, and preferably to a pH of between 10-14 or 11-14 or 10-12. By doing so, the tight structure of the cell walls can be loosened.

In another preferred embodiment, the invention relates to a method wherein said pH treatment comprises treating said suspension for at least 2 hours at a pH lower than 3, preferably a pH between 1 and 3, a temperature of at least 100° C., and a pressure which is at least 1 bar higher than the ambient pressure.

More in particular, it is also possible to disentangle the cellulose and pectine-molecules in the cell-wall by decreasing the pH, preferably to a pH lower than 3, 2, or 1, and preferably by applying a pH of between 3 and 1. By doing so, the tight structure of the cell walls can also be loosened.

In order to succeed, additional energy is to be applied, for example in the form of an increased temperature. Preferably the temperature is increased to a temperature of at least 70, 80, 90, 100, 110, 115, 120, 125, 130, 135, 140° C.

Furthermore, in order to avoid that the suspension would boil and that thus a lot of energy would be lost, and that an industrial process would become less feasible, the pressure applied during the process is also preferably increased. In a preferred embodiment, the applied pressure or ambient pressure is initially comprised between 1 and 1.5 bar, and is for instance 1, 1.1, 1.2, 1.3, 1.4 or 1.5 bar. Preferably said applied or ambient pressure is raised during the method to a pressure comprised between 2 to 5 bar, and for instance to a pressure of 2, 3, 4 or 5 bar. The terms "ambient pressure" and "applied pressure" are used herein as synonyms.

In a preferred embodiment, the present suspension is therefore maintained in step c) for at least 3 hours, and preferably for more than 3 hours at a suitable pH, and for instance a pH of 10 to 14 or a pH of 1 to 3, a temperature of at least 120° C., and a pressure which is at least 1 bar higher than the ambient pressure.

After a certain contact time, for instance 0.5, 1, 2, 3, 4, 5, etc. . . . hours, the pH can be adjusted again and the pH of the suspension can be brought to a pH value corresponding to the pH of the suspension obtained in step a). Preferably the pH is adjusted to a pH which provides optimal conditions for the activity of enzymes that are added to the suspension in a next step of the present method. The method therefore comprises the step of bringing said suspension to a pH that is for instance lower than 10, 9, 8 or 7, preferably to a pH comprised between 5 and 7. In a preferred embodiment, the invention relates to a method wherein the suspension is brought in step d) to a pH of 5 to 7, and for instance to a pH of 5 to 6. When using cell-wall degrading enzymes such as e.g. cellulases, the cell-walls that have been weakened due to the above described pH treatment, can now be broken down even more. This also shows that the pH treatment is a non-reversible process.

When filtrating this treated suspension, a lot of foam—that can be visually observed—is created, indicating that pectines and proteins are released from the cocoa cell structures.

Another embodiment of the invention relates to a method as described above, wherein said suspension is prepared by mixing the cocoa powder with a solution comprising salt in a below isotonic concentration.

Another embodiment of the invention relates to a method as described above, wherein said suspension is prepared by mixing the cocoa powder with distilled water or double distilled water.

Another embodiment of the invention relates to a method as described above, further comprising a step of ultrasonic treatment during step c).

Another embodiment of the invention relates to a method as described above, wherein the separation is performed by filtration, decantation centrifugation, or a combination thereof.

Another embodiment of the invention relates to a method as described above, wherein the suspension obtained in step b) is submitted to a heat shock treatment before being submitted to said pH treatment. Preferably said heat shock treatment comprises cooling the suspension obtained in step b) to a temperature below 0° C., and preferably below −10° C., −20° C., −30° C. or even below −40° C., followed by shock heating the cooled suspension by contact with a hot aqueous solution of at least 70° C. In a preferred embodiment, said aqueous solution is pure water or distilled or double distilled water at a temperature of between 95 and 100 deg C.

Another embodiment of the invention relates to a method as described above, wherein said soluble cocoa components are freeze dried, roller dried or spray dried.

Optionally the present method may further comprise an additional step of desalting the soluble part obtained in step f).

A second aspect of the invention relates to a method for producing a soluble cocoa product from cocoa powder comprising the steps:

1) Preparing an aqueous suspension of cocoa powder (21),
2) Treating (22) the suspension with one or more degrading enzymes,
3) Separating (24) the treated suspension (23) into insoluble material (226) and a soluble part (25).
4) Freezing (227) the insoluble material (226), 5) Shock heating (210) the frozen insoluble material (228) by contact with hot aqueous solution, to obtain a further treated suspension (211),
6) Separating (229) the further treated suspension (211) into insoluble material and a soluble part (25'), and
7) Obtaining soluble cocoa components (212) from the soluble parts (25, 25').

Another embodiment of the invention relates to the second aspect method as described above, wherein said suspension is prepared by mixing the cocoa powder with a solution comprising salt in a below isotonic concentration.

Another embodiment of the invention relates to the second aspect method as described above, wherein said suspension is prepared by mixing the cocoa powder with distilled water or double distilled water.

Another embodiment of the invention relates to the second aspect method as described above, wherein said degrading enzymes are any of amylases, polyphenolase, proteases, pentosanases, glucanases, cellulases, carbohydrases, xylanases, pectinases, and alpha-amylase.

Another embodiment of the invention relates to the second aspect method as described above, further comprising step of ultrasonic treatment before, during or after step 2).

Another embodiment of the invention relates to the second aspect method as described above, wherein the separation (24) is performed by filtration, decantation, centrifugation, or a combination thereof.

Another embodiment of the invention relates to the second aspect method as described above, wherein said insoluble material (226) is frozen by placing in a freezer or by contacting with a freezing substance.

Another embodiment of the invention relates to the second aspect method as described above, wherein said hot aqueous solution is preferably at 70 deg C. or above.

Another embodiment of the invention relates to the second aspect method as described above, wherein said aqueous solution is pure water or distilled or double distilled water at 95 and 100 deg C.

Another embodiment of the invention relates to the second aspect method as described above, further comprises the steps of:
5a) Treating (22') the further treated suspension (211) with one or more degrading enzymes to obtain a further treated suspension (211),
5b) Optionally repeating (213*a*) step 5a) at least once.

Another embodiment of the invention relates to the second aspect method as described above, further comprises the steps of:
5a) Treating (22') the further treated suspension (211) with one or more degrading enzymes,
5b) Repeating (213*b*), at least once, steps 3) to 5a) using the further treated suspension (211) of step 5a).

Another embodiment of the invention relates to the second aspect method as described above, wherein said soluble cocoa components (212) are freeze dried, roller dried or spray dried.

Optionally, another embodiment of the invention relates to the second aspect method as described above, further comprising a step of desalting the soluble part obtained in step 7).

Another embodiment of the invention relates to the second aspect method as described above, applied to solubilising plant material.

Another embodiment of the invention relates to a method for solubilising plant material comprising the steps of:

1) Freezing the plant material,
2) Shock heating the frozen plant material (228) by contact with hot aqueous solution, to obtain a further treated suspension (211),
3) Separating the further treated suspension (211) into insoluble material and a soluble part (25'), and
4) Obtaining soluble plant material from the soluble parts.

Another embodiment of the invention relates to method for solubilising plant material as described above, comprising additional conditions or steps as defined above in the second aspect method.

In a third aspect, the invention relates to a method for producing a soluble cocoa product from cocoa powder comprising the steps of:
a) preparing an aqueous suspension of cocoa powder (31),
b) optionally treating said suspension with one or more degrading enzymes (32),
c) submitting (33) the suspension obtained in step b) to a pH treatment (335) comprising treating said suspension for at least 2 hours at a suitable pH, a temperature of at least 100° C., and a pressure which is at least 1 bar higher than the ambient pressure,
d) optionally bringing the pH of the suspension obtained in step c) to a pH value corresponding with the pH of the suspension obtained in step a),
e) treating (32') the suspension obtained in step c) or d) with one or more degrading enzymes,
f) separating (34) the suspension (33) obtained in step e) into insoluble material (336) and a soluble part (35), whereby said insoluble material is subjected to the steps of:
i. Freezing (337) the insoluble material (336),
ii. Shock heating (310) the frozen insoluble material (338) by contact with hot aqueous solution, to obtain a further treated suspension (311),
iii. Separating (339) the further treated suspension (311) into insoluble material and a soluble part (35'), and
g) Obtaining soluble cocoa components (312) from the soluble parts (35, 35').

Another embodiment of the invention relates to the third aspect method as described above, further comprising the steps as defined in any of claims 1 to 16.

Optionally, another embodiment of the invention relates to the third aspect method as described above, further comprising a step of desalting the soluble part obtained in step g).

In a fourth aspect, the invention relates to a soluble cocoa product having a degree of solubility in a solvent, preferably a polar solvent and preferably a water-based solvent, i.e. a solvent containing water, of at least 50%, and more preferably at least 70%, and even more preferably of at least 90%. In a particularly preferred embodiment a soluble cocoa product is provided having a degree of solubility in a solvent, preferably a polar solvent, of between 95 and 100%, and preferably of between 98 and 100%.

The present invention also relates to a soluble cocoa product obtained by a method as described above. The invention also relates to a soluble cocoa product obtainable by a method as described above. The present soluble cocoa product has an improved composition and nutritional value. In a preferred embodiment, said soluble cocoa product has a solubility of at least 50%, and preferably of at least 60, 65, 70, 75, 80, 85, 90, 95%, 99% and preferably a solubility of between 50-100%, preferably of between 80-100%, and more preferably of between 95-100% or even of between 98 and 100%.

In yet another aspect the invention relates to a pre-concentrate comprising a soluble cocoa product as defined herein, whereby said pre-concentrate is in a liquid form, preferably in the form of a syrup or solution, or in a solid form, preferably in the form of a dry or lyophilized (freeze-dried) form.

In still another aspect, the invention relates to a beverage pouch comprising the soluble cocoa product or a pre-concentrate as described above.

In yet another aspect, the invention relates to a beverage comprising a soluble cocoa product or a pre-concentrate as described above.

With the insight to better show the characteristics of the invention, some preferred embodiments and examples are described hereafter referring to the enclosed drawing.

FIGURE LEGENDS

DETAILED DESCRIPTION OF THE INVENTION

Figure 1:
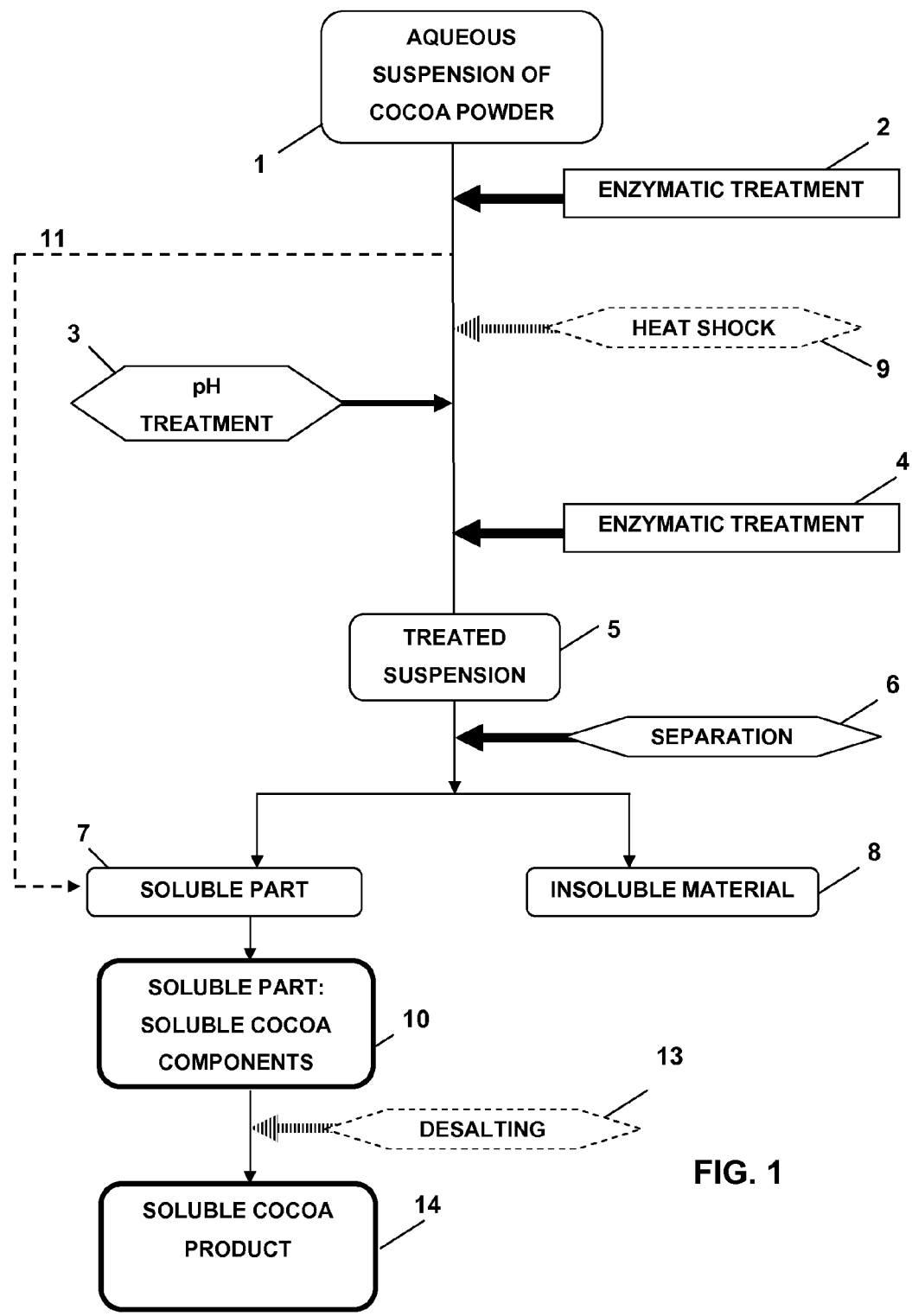
FIG. 1 is a flow chart showing steps of a method according to a first aspect of the present invention.

Unless defined otherwise, all technical and scientific terms used herein have the same meaning as is commonly understood by one of skill in the art. All publications referenced herein are incorporated by reference thereto. All United States patents and patent applications referenced herein are incorporated by reference herein in their entirety including the drawings.

The articles "a" and "an" are used herein to refer to one or to more than one, i.e. to at least one of the grammatical object of the article. By way of example, "a sample" means one sample or more than one sample.

Throughout this application, the term "about" is used to indicate that a value includes the standard deviation of error for the device or method being employed to determine the value.

The recitation of numerical ranges by endpoints includes all integer numbers and, where appropriate, fractions subsumed within that range (e.g. 1 to 5 can include 1, 2, 3, 4 when referring to, for example, a number of samples, and can also include 1.5, 2, 2.75 and 3.80, when referring to, for example, temperatures). The recitation of end points also includes the end point values themselves (e.g. from 1.0 to 5.0 includes both 1.0 and 5.0).

Where a percentage is recited in respect of a quantity, it refers to a weight ratio (w/w).

By "soluble components", it is meant that these are molecules, in a fluid at ease, that do not sink or form a sediment under any force, for example gravitation force.

"Solubility" refers to the ability for a given substance, herein cocoa powder (the solute) to dissolve in a fluid at ease, in particular a solvent. Solvents comprise polar solvents, and preferably water-based solvents, i.e. solvents containing water, such as, but not limited to water, milk, an alcohol (e.g. an alcoholic drink containing water), and mixtures thereof. Solubility is measured in terms of the maximum amount of solute (herein the cocoa powder) dissolved at a specified temperature in a definite amount of the solvent at equilibrium, without the use of emulsifiers. The term "% solubility" (or % dissolution) as used herein thus refers to the amount in weight % of cocoa powder that is dissolved in a solvent. A value of 50% solubility for instance indicates that 50 wt % of the cocoa powder is dissolved, while 50 wt % will sink or form a sediment. 100% solubility refers to a cocoa powder which is wholly soluble in a solvent so that such solution remains free of sediment.

Solubility is measured by agitating or shaking at a temperature of 20° C. and a pressure of 1 atm an amount of 10 gram of solute (herein the cocoa powder) with an amount of 90 g of solvent of choice for at least 2 hours, when avoiding evaporation by using a closed system. Then the solution is filtered over a whatmann filter with a pore size between 5 and 12 micrometers. The filtrate is dried in an oven overnight at 105° C., and the amount of dry matter is determined. Solubility is calculated based on the amount of dry matter remaining after filtration compared to the amount of solute put into practice.

Another technique includes centrifugation of an amount of 10 gram of solute (herein the cocoa powder) with an amount of 90 g of solvent with a centrifuge at 10000 RPM for 5 minutes. After centrifugation, the upper 'soluble' layer is used to measure the dry matter content according to the procedure as described above.

The terms "cocoa powder" and "cocoa start powder" are used herein as synonyms and are intended to refer to a cocoa powder that is used as starting material in a method of the present invention. Such cocoa powder contains soluble as well as insoluble cocoa components.

The terms "cocoa end powder", "cocoa produce", "soluble cocoa powder" and "soluble cocoa product" are used herein as synonyms and are intended to refer to a cocoa powder that is obtained or that is obtainable as end product when carrying out a method of the present invention.

The term "soluble cocoa components" refers to molecules derived from cocoa that do not sink or form a sediment under any force, for example gravitation force in a fluid at ease, e.g. in a polar, water-based solvent as defined above such as milk, water, an alcohol or a mixture thereof.

The present invention relates to the finding that the "solubilisation" of cocoa powder can be increased by a process applying different techniques, including a combination of enzymatic treatment, pH treatment under increased pressure, and temperature treatment. It further relates to the finding that the solubilisation of cocoa powder can alternatively be increased by a process whereby the different techniques include enzymatic treatment, ultrasonic treatment and heat shocking.

The term "solubilising" refers to the process of extracting soluble cocoa components from a starting material, herein a cocoa start powder. In certain embodiments of the present invention, the term "solubilising", "recuperating" or "extracting" or "making soluble" are used as synonyms. The term "solubilisation" in this context thus refers to a process of solubilising soluble component from a starting material, herein a cocoa powder.

In certain embodiments of the present invention, the terms "solubilisation" and "yield" are used as synonyms. A solubilisation or yield of 70% for instance indicates that 70% of the cocoa components present in a starting material (a cocoa start powder) are solubilised or are already soluble and are recuperated in accordance with a method according to the invention.

The invention provides a method having a yield of between 50 and 100%, and preferably of at least 50, 55, 60, 65, 70, 75, 80, 85, 90, 95, or 99%. The invention thus relates to a method for providing a solubilisation of a cocoa powder of between 50 and 100% and preferably of at least 50, 55, 60, 65, 70, 75, 80, 85, 90, 95, or 99%. Moreover, the present invention provides a method wherein solubilisation of a cocoa powder can be substantially increased by applying only once the different steps of the methods as defined herein and without having the need to repeat two or more times one or more of the steps of a method as defined herein.

The yield or solubilisation is determined in accordance with the present invention according to the following method:
- a suspension is prepared, e.g. a suspension of 10% w/w is prepared by suspending 10 grams of cocoa powder in 90 grams of distilled water,
- a first sample thereof is dried in an oven at 105° C. overnight, and the dry matter content thereof is determined. From this dry matter content the dry amount of added enzymes and pH-regulating substances (such as e.g. alkali or acid solutions such as NaOH or HCl solutions) is deduced. This corresponds to the first dry matter content.
- a second sample thereof is filtered over a whatmann filter with a pore size between 5 and 12 micrometers. The filtrate is also dried in an oven overnight at 105° C., and the dry matter content thereof was determined. From this dry matter content, the dry amount of the soluble fraction of added enzymes and pH-regulating substances (such as e.g. alkali or acid solutions such as NaOH or HCl solutions) is deduced. This corresponds to the second dry matter content.

The quotient of the dry matter contents (expressed as a percentage compared to the first dry matter content) corresponds to the amount of cocoa powder that is solubilised. For instance, if the dry matter content of the first sample is 20 g and dry matter content of the second sample is 5 g, 25% of the cocoa powder has been solubilised. Or, if the dry matter content of the first sample is 20 g and dry matter content of the second sample is 10 g, 50% of the cocoa powder has been solubilised.

The invention provides a method for increasing solubilisation of a cocoa powder. The term "increasing solubilisation" in this context refers to a process which permits to increase the amount (in % w/w) of soluble cocoa components that can be extracted from a starting material, herein a cocoa powder. Compared to prior art methods, the present method permits to increase solubilisation of a cocoa powder with a factor of between 2 and 4. In other words, compared to prior art methods, the present method permits to increase the amount of soluble cocoa components that can be extracted or solubilised from a (standard) cocoa powder with a factor of between 2 and 4. An increase with a factor 2 for instance means that two times more soluble cocoa components can be extracted from a cocoa start powder with the present method compared to a prior art method (as illustrated for instance in example 1).

According to the present invention, between 50 and 100% (w/w) of cocoa (start) powder can be solubilised, i.e. can be recuperated from a cocoa start powder, while maintaining an acceptable good taste. This compares with a maximum of 45% achievable using existing techniques and knowledge, such as enzyme-treatment. The present methods further involve a significant improvement, since they have a very high yield. The new techniques are a significant improvement that almost double the yield, and yet are inexpensive to implement, using low cost physical treatments. Furthermore, they can avoid the use of chemicals, relying on aqueous solutions such as distilled water.

Reference is made in the description below to the drawings which exemplify particular embodiments of the invention; they are not at all intended to be limiting. The skilled person may adapt the present methods and substitute or insert or remove features and steps according to the common practices of the person skilled in the art.

Cocoa Powder

The cocoa powder used as starting material in the invention is ordinary cocoa powder known to the person skilled in the art. An example of a composition of such powder is given in example 7.

Cocoa powder is prepared according to standard methods, for example, selecting cleaned cacao beans, crushing the beans in a crusher, removing the shells in a winnower, adding an alkalizing agent in a reactor, followed by grinding in a mill. Then, cocoa cake is obtained by removing part of cocoa butter from the cocoa mass in a cocoa press. The cocoa powder is produced by pulverizing the cake to fine powder in a pulverizer. In the above processes, the cocoa powder may or may not be alkalized, or an alkalized and a non-alkalized product may be used in combination.

As already described elsewhere, cocoa powder is available having a range of fat content, depending primarily on the amount of cocoa butter removed. The present invention applies to all ranges, improving the yield of soluble material regardless of the fat content. The yield is regardless to the fat content, when using a filter for separation of soluble and insoluble material. The fat will not dissolve in the water, but will also pass through the filter.

The cocoa powder may be in the form of particles obtained by spray drying having a substantially spherical shape. The average particle size may be from about 20 to 100 micrometers.

The particles may be further subjected to granulation into a granular form of a suitable size. Conventional granulation methods may be used, but the fluidized bed granulation and agitation granulation methods are especially preferred.

Aqueous Suspension or Dispersion

The aqueous suspension or dispersion of cocoa powder 1, 21, 31 comprises cocoa powder at a concentration of 1, 2, 3, 4, 5, 10, 15, 20, 25, 30, 35, 40, 45%, or a value in the range between any two of the aforementioned values. Preferably, the concentration of cocoa powder is between 1 and 35% w/w. The aqueous component is a water-based solution described below. The suspension is prepared according to known methods, generally being homogenised to achieve an essentially uniform suspension.

It will be noted that in certain embodiment of the present invention the terms "suspension", or "dispersion" are used herein as synonyms.

The aqueous solution as used herein comprises water, and may also contain additional compounds such as minerals, salts, buffering agents, preservatives or any agents which maintain a suitable operating environment for enzymatic degradation. Such components are known in the art. Where additional compounds are present, they may be in a quantity below isotonic concentrations. This may mean the effective salt concentration of the additional compounds may be below that present in cells of cocoa powder.

The aqueous solution may be devoid of additional compounds, in which case the aqueous solution may consist of pure water e.g. distilled water, double distilled water, or purified distilled water. Alkali (e.g. $OH^-$, $NH_4^+$) or acid ions (e.g. $H^+$) may be present to adjust the pH.

Method According to a First Aspect

With reference to FIG. 1, a method according to a first aspect of the present invention is illustrated. The method for producing a soluble cocoa product from cocoa powder comprises the steps:
a) preparing an aqueous suspension of cocoa powder 1,
b) treating said suspension with one or more degrading enzymes 2, c) submitting 3 the suspension obtained in step b) to a pH treatment comprising treating said suspension for at least 2 hours at a suitable pH—for instance at a pH at least 7, and preferably at least 10, or at a pH lower than 3—a temperature of at least 100° C., and a pressure which is at least 1 bar higher than the ambient pressure, d) optionally bringing the pH of the suspension obtained in step c) to a pH value corresponding with the pH of the suspension obtained in step a), e) treating 4 the suspension obtained in step c) or d) with one or more degrading enzymes, and f) separating 6 the suspension 5 obtained in step e) into insoluble material 8 and a soluble part 7.

The soluble cocoa components 10 are then obtained from the soluble part 7. This method may further comprise the step of desalting 13 the soluble part containing the soluble cocoa components 10, e.g. by means of ion exchange, to remove salts.

Enzymatic Treatment (2, 4)

The degrading enzymes used during enzymatic treatment 2, 4 are those which are capable of degrading insoluble molecules present in cocoa, such as polysaccharides, proteins, cellulose and others. These degrading enzymes are well known in the art of extraction of cocoa powder. Examples of degrading enzymes used in the art include polyphenolases, amylases, proteases, trypsine, pentosanases, glucanases, cellulases, hemicellulase, trypsine, carbohydrases, xylanases, pectinases, tannase, beta-amylase and alpha-amylase. One or more of these may be used in the enzymatic treatment of the suspension in the present invention.

The present invention encompasses the separate and sequential treatment with different classes of enzymes.

More in particular, the present method comprises a first enzymatic treatment 2 which is carried out on the above-described aqueous suspension of cocoa powder obtained in step a). The degrading enzymes used during such first enzymatic treatment 2 are those which are capable of degrading starch present in cocoa, such as amylase, alpha-amylase and others. These degrading enzymes are well known in the art of extraction of cocoa powder.

The present method further comprises a second enzymatic treatment 4 which is carried out on the above-described suspension of cocoa powder that has been subjected to a first enzymatic treatment 2 and a pH treatment and that is obtained in step c) or d) of the present method.

Factors such as temperature, agitation, concentration and time of the enzymatic treatment 2,4 can be optimised according to the knowledge of the skilled person.

The enzymatic treatment 2,4 is generally allowed to continue until no further activity is detected, or after the rate of degradation has started to decrease. According to one aspect of the invention, the enzymatic treatment 2,4 proceeds for less than 1, 2, 3, 4, 5, 6, 7, 8, 9, hours, or for a period in a range between any two of the aforementioned values. Preferably, the enzymatic treatment 2,4 proceeds between 2 and 3 hours at optimal enzyme operating temperatures.

The concentration of enzyme used in the enzymatic treatment 2,4 will depend on its activity and also on the type of cocoa powder. The concentration can be optimised by the skilled person according to standard laboratory procedures. Generally the quantity of enzyme used is 0.1% w/w dry solids, though higher or lower concentrations are equally possible given the multiple factors available. According to one aspect of the invention, the total concentration of enzyme used is 0.01, 0.02, 0.05, 0.1, 0.15, 0.2% w/w dry solids, or a concentration in a range between any two of the aforementioned values. Preferably, the concentration of enzyme is between 0.01 and 0.10% w/w dry solids.

The temperature at which the enzymatic treatment 2,4 proceeds will depend on the optimum operating temperature of the enzymes, the type if cocoa powder and the stability of the components in the cocoa powder. Generally the enzymatic treatment 2 proceeds at the optimum pH and temperature for every enzyme, though higher or lower temperatures are equally possible given the multiple factors available. According to one aspect of the invention, the enzymatic treatment proceeds at a temperature equal to or less than 20, 30, 40, 50, 60, 70, 80, 90, 100, 110, 120 or 130 deg C., or a temperature in a range between any two of the aforementioned values.

In a preferred embodiment, enzymatic treatment 4 of the suspension in step e) according to the present invention comprises the subsequent steps of:

e1) treating with one or more cell-wall degrading enzymes, preferably selected from the group comprising pentosanases, glucanases, cellulases, hemicellulases carbohydrases, xylanases, pectinases, tannases, and more preferably cellulases and pectinases, e2) treating with one or more protein degrading enzymes, preferably selected from the group comprising proteases, e.g. trypsine, and e3) optionally treating with one or more other enzymes such as for instance polyphenolases.

According to such process, first cell wall structures are degraded by applying cell wall degrading enzymes. After such step, protein degrading enzymes are applied, for instance proteases, or for instance other enzymes capable of degrading protein into peptides. The invention reveals that when the cocoa cell walls are first broken, it is possible to enzymatically treat molecules that were encapsulated in the cell, such as proteins. In a particularly preferred embodiment, first cellulases and pectinases are applied, followed by proteases. Optionally further enzymes that have an effect on a non-solubilized components comprised in the cocoa suspension can be applied, e.g. polyphenolase.

In some embodiments, the enzymatic treatments 2, 4 are repeated more than once.

The suspension is generally agitated continuously during enzymatic treatment 2,4. This is achieved, using, for example, using a stirrer, jets, agitated vessel or any means known in the art.

After enzymatic treatment 2, 4, the reaction may be stopped. This can be achieved, for example, by heating to an inactivation temperature (e.g. 95 deg C.) or by adding an enzyme inhibitor to the mixture.

In an alternative embodiment, preferably when no heat shock treatment is applied (see below), step b) (i.e. enzymatic treatment 2) of the present method may be combined with step e2).

pH-Pressure Treatment (3)

The suspension that has been enzymatically treated with starch degrading enzyme(s) 2 is submitted to a pH treatment.

In one embodiment, the pH treatment 3 comprises treating said suspension for at least 2 hours at a pH of at least 7, a temperature of at least 100° C., and a pressure which is at least 1 bar higher than the applied or ambient pressure. The pH of the suspension can be increased to a pH higher than 7, and for instance to a pH of 7.5, 8, 8.5, 9, 9.5, 10, 10.5, 11, 11.5, 12, 12.5, 13, 13.5, or 14. Preferably the pH is raised to a pH of between 10 and 14.

In another embodiment, the pH treatment 3 comprises treating said suspension for at least 2 hours at a pH lower than 3, a temperature of at least 100° C., and a pressure which is at least 1 bar higher than the applied pressure. The pH of the suspension can be decreased to a pH lower than 3, and for instance to a pH of 2.8, 2.5, 2.3, 2.0, 1.8, or 1.5.

A further optional step may comprise bringing the pH of the suspension obtained in step c) to a pH value corresponding with the pH of the suspension obtained in step a).

The temperature is preferably higher than 100° C., the surrounding pressure must be high enough to prevent the suspension from boiling. Preferably, the temperature is equal to or more than 120° C. while the applied pressure is raised with 1 bar. These conditions can be obtained in a standard autoclave, used for sterilisation purposes. The contact time depends on the pH and temperature. When using 120° C. and pH 12 as parameters, a minimum contact time of 3 hours is preferably applied to treat the cell-walls.

After treatment with a pH of at least 7, the pH can be lowered to its initial value, preferably to a pH lower than 10, 9, 8, or 7, and for instance to a pH of 6, 5.5 or 5. After treatment with a pH of lower than 3, the pH can be increased to its initial value, and for instance to a pH of 5, 5.5 or 6. This step permits to obtain a suspension with a neutral pH and with a pH value which is suitable for the activity of enzymes that will be applied to the suspension in a next step.

The choice of acid is preferably related to the used alkali. The resulting salt preferably is non-toxic and preferably non-soluble. Adjusting the pH, by adding an acid and an alkali, causes a great taste change by means of salt formation. This can be avoided by using an acid and an alkali that forms a highly insoluble salt. When separating the soluble and insoluble fraction afterwards, this salty taste can be avoided. For example $Ca(OH)_2$ and $H_3PO_4$ form a the highly insoluble calcium phosphate. Preferably for adjusting the pH use is made of an acid and an alkali that provide a salt having a solubility factor lower than $10^{-10}$. For instance for the above given example, the solubility factor can be calculated as: $([Ca]^3 \times [PO_4]^2)/[Ca_3(PO_4)_2]$ which should be lower than $10^{-10}$. The obtained salt and the used acid and alkali are non toxic.

In an example, common acids and alkali such as NaOH and/or HCl can be used. When using such acids and alkali, the soluble part obtained by the present method may be desalted in order to remove soluble salts. This desalting step can for instance be done after separating the soluble part from the insoluble material and can for instance by performed by means of ion exchange.

Heat Shock Treatment (9)

The suspension obtained in step b) can be submitted to a heat shock treatment 9 before being submitted to the above-described pH treatment. Heat shock treatment is preferably carried out after the first enzymatic treatment 2.

Heat shock treatment 9 may comprises cooling the suspension obtained in step b) to a temperature below 0° C., and preferably below −10, −20, −30, or even −40° C., followed by shock heating the cooled suspension by contact with a hot aqueous solution of at least 70° C.

The temperature of the aqueous solution, sufficient to induce a shock effect is generally above 70 deg C., although there are also results with water at room temperature. According to one aspect of the invention, the temperature of the hot aqueous solution is equal to or greater than 70, 75, 80, 85, 90, 95, 96, 97, 97, 99, 100 deg C. or a value in the range between any two of the aforementioned values. Preferably, the temperature is between 85 and 100 deg C., preferably it is about 99 deg C. The step is normally performed at a pressure of 1 atmosphere, though it is within the scope of the invention to perform the step under reduced or increased pressure.

Preferably said aqueous solution is pure water or distilled or double distilled water at a temperature of between 95 and 100 deg C.

The heat shock can be allowed to continue until the temperature of the water has stabilised. Generally, the heat shock will be complete in less than 1 hour. According to one aspect of the invention, the heat shock proceeds for less than 0.25, 0.5, 0.6, 0.7, 0.8, 0.9, 1, 2, 3, 4, 5, 6, 7, 8, 9, 10 hours, or for a period in a range between any two of the aforementioned values. Preferably, the heat shock proceeds less than 30 minutes.

The ratio between the mass of suspension and mass of hot aqueous solution should be less than 1 i.e. there is an excess of hot aqueous solution. According to one embodiment of the invention, this ratio is less than or equal to 0.001, 0.003, 0.006, 0.01, 0.02, 0.04, 0.6, 0.08, 0.1, 0.2, 0.4, 0.8 or a value in the range between any two of the aforementioned values. Preferably it is between 0.1 and 0.5.

After heat shock, the treated suspension is submitted to a pH treatment as described above.

Ultrasonic Treatment

A step of ultrasonic treatment can optionally be applied to the aqueous suspension of cocoa powder 1. It can be applied before, during or after, but preferably during the pH treatment 3 of step c). This technique does not cause any taste changes to the product or significant molecular changes. The ultrasonic treatment can be applied using an ultrasonic probe, using an ultrasonic bath, or using any suitable means. According to one aspect of the invention, the ultrasonic treatment proceeds for less than 1, 2, 3, 4, 5, 6, 7, 8, 9, 10 minutes, or for a period in a range between any two of the aforementioned values. Preferably, the ultrasonic treatment proceeds for about 1 minute per litre at 25 kHz.

An ultrasonic treatment as applied in the methods of the present invention is meant to include treatments that proceed at more than 20 kHz. Such treatments do not comprise microwave treatments, which generally proceed at between 300 MHz and 300 GHz.

Separation (6)

The treated suspension 5 is separated 6 into insoluble material 8 and a soluble part 7. The soluble part 7 comprises the soluble cocoa components 10 together with the aqueous solution.

The separation 6 may be performed by any suitable means, for example filtration, decantation, centrifugation, a combination thereof, or any suitable technique known in the art. Representative techniques include filtration separation methods, such as continuous or discontinuous vacuum-filtration or ultrafiltration or a combination of these methods. Where centrifugation is used, it may be continuous or discontinuous. It can be performed at temperature in the range of from about 20 deg C. to about 40 deg C. for from about 20 minutes to about 30 minutes under a centrifugal force of from about 20,000 Z to about 32,000 Z. In some embodiments, the separation step 6 is repeated more than once.

During separation it is possible to remove the fat from the soluble components by using for example a 3-way decanter or a 3-way separator.

Additional Step (11)

The suspension obtained after step b) of the present method may optionally be separated into insoluble material and a soluble part 7. This is depicted in FIG. 1 as the hatched line 11. The soluble part 7 comprises the soluble cocoa components 10 together with the aqueous solution.

The separation may be performed by any suitable means, for example filtration, centrifugation, a combination thereof, or any suitable technique known in the art. Representative techniques include filtration separation methods, such as continuous or discontinuous vacuum-filtration or ultrafiltration or a combination of these methods. Where centrifugation is used, it may be continuous or discontinuous. It can be performed at temperature in the range of from about 20 deg C. to about 40 deg C. for from about 20 minutes to about 30 minutes under a centrifugal force of from about 20,000 Z to about 32,000 Z. In some embodiments, this separation step may be repeated more than once.

The residue that is obtained after this separation can be re-dissolved and further treated according to the present method. The soluble part obtained after treatment of such residue according to steps of the present method can then be combined with the soluble part that have been separated in an earlier stage of the process.

Method According to a Second Aspect

Figure 2:
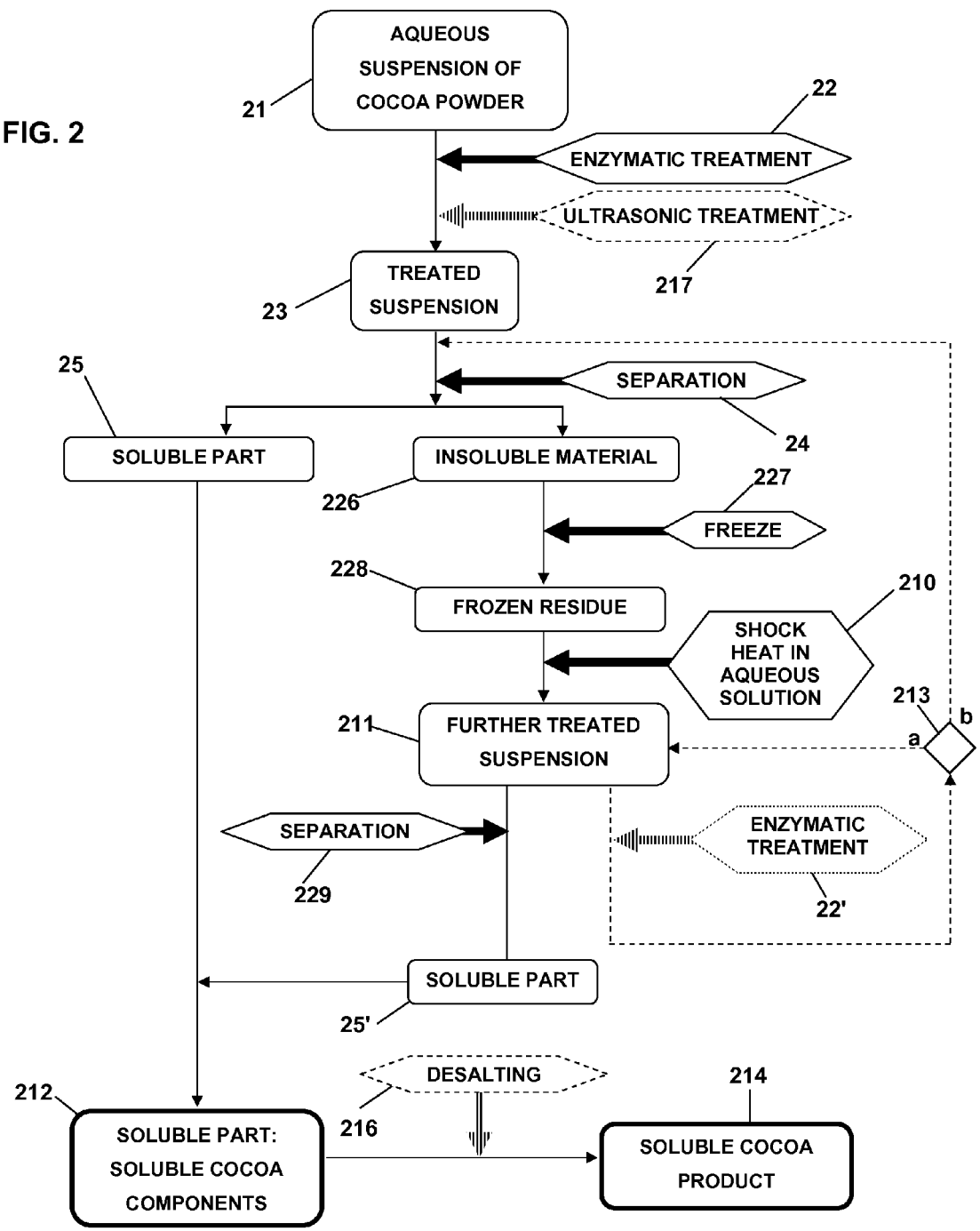
FIG. 2 is a flow chart showing steps of a method according to a second aspect of the present invention.

With reference to FIG. 2, a method according to a second aspect of the present invention is illustrated. The method for producing a soluble cocoa product from cocoa powder comprises the steps:

1) Preparing an aqueous suspension of cocoa powder 21,
2) Treating 22 the suspension with one or more degrading enzymes,
3) Separating 24 the treated suspension 23 into insoluble material 226 and a soluble part 25.
4) Freezing 227 the insoluble material 226,
5) Shock heating 210 the frozen insoluble material 228 with hot aqueous solution, to obtain a further treated suspension 211, and
6) Separating the further treated suspension 211 into insoluble material and a soluble part 25'.

The soluble cocoa components 212 are then obtained from the soluble part 25, 25'. This method may further comprise the step of desalting (not illustrated) the soluble part containing the soluble cocoa components 212, e.g. by means of ion exchange, to remove salts.

Enzymatic Treatment (22)

The degrading enzymes used during enzymatic treatment 22 are those which are capable of degrading polymeric biomaterials such as polysaccharides and/or proteins. These degrading enzymes are well known in the art of extraction of cocoa powder. Indeed steps 1) to 3) may be performed according to known procedures.

Examples of degrading enzymes used in the art include polyphenolases, amylases, proteases, pentosanases, glucanases, cellulases, carbohydrases, xylanases, pectinases, beta-amylase and alpha-amylase. One or more of these may be used in the enzymatic treatment of the suspension in the present invention.

Factors such as temperature, agitation, concentration and time of the enzymatic treatment 22 can be optimised according to the knowledge of the skilled person.

The enzymatic treatment 22 is generally allowed to continue until no further activity is detected, or after the rate of degradation has started to decrease. According to one aspect of the invention, the enzymatic treatment 22 proceeds for less than 1, 2, 3, 4, 5, 6, 7, 8, 9, hours, or for a period in a range between any two of the aforementioned values. Preferably, the enzymatic treatment 22 proceeds between 2 and 3 hours at optimal enzyme operating temperatures.

The concentration of enzyme used in the enzymatic treatment 22 will depend on its activity and also on the type of cocoa powder. The concentration can be optimised by the skilled person according to standard laboratory procedures. Generally the quantity of enzyme used is 0.1% w/w dry solids, though higher or lower concentrations are equally possible given the multiple factors available. According to one aspect of the invention, the total concentration of enzyme used is 0.01, 0.02, 0.05, 0.1, 0.15, 0.2% w/w dry solids, or a concentration in a range between any two of the aforementioned values. Preferably, the concentration of enzyme is between 0.01 and 0.10% w/w dry solids.

The temperature at which the enzymatic treatment 22 proceeds will depend on the optimum operating temperature of the enzymes, the type if cocoa powder and the lability of the components in the cocoa powder. Generally the enzymatic treatment 22 proceeds at the optimum pH and temperature for every enzyme, though higher or lower temperatures are equally possible given the multiple factors available. According to one aspect of the invention, the enzymatic treatment proceeds at a temperature equal to or less than 20, 30, 40, 50, 60, 70, 80, 90, 100, 110, 120 or 130 deg C., or a temperature in a range between any two of the aforementioned values.

In some embodiments, the enzymatic treatment 22 is repeated more than once e.g. again after the freezing 227 and heat shock 210 steps.

The suspension is generally agitated continuously during enzymatic treatment 22. This is achieved, using, for example, using a stirrer, jets, agitated vessel or any means known in the art. After enzymatic treatment 22, the reaction may be stopped. This can be achieved, for example, by heating to an inactivation temperature (e.g. 95 deg C). or by adding an enzyme inhibitor to the mixture.

Ultrasonic Treatment (217)

A step of ultrasonic treatment 217 can optionally be applied to the aqueous suspension of cocoa powder 1. It can be applied before, during or after the enzymatic treatment 22 of step 2). Where it is applied before enzymatic treatment, the ultrasonic treatment 217 may make it easier for the enzymes to bind to their substrate, and for the heat shock treatment to be effective. This technique does not cause any taste changes to the product or significant molecular changes. The ultrasonic treatment can be applied using an ultrasonic probe, using an ultrasonic bath, or using any suitable means. According to one aspect of the invention, the ultrasonic treatment 217 proceeds for less than 1, 2, 3, 4, 5, 6, 7, 8, 9, minutes, or for a period in a range between any two of the aforementioned values. Preferably, the ultrasonic treatment 217 proceeds for about 1 minute per litre at 25 kHz. Ultrasonic treatment is as defined above.

Separation (24)

The treated suspension 23 or further treated suspension 211 is separated 24 into insoluble material 226 and a soluble part 25, 25'. The soluble part 25, 25' comprises the soluble cocoa components 212 together with the aqueous solution.

The separation 24 may be performed by any suitable means, for example filtration, decantation, centrifugation, a combination thereof, or any suitable technique known in the art. Representative techniques include filtration separation methods, such as continuous or discontinuous vacuum-filtration or ultrafiltration or a combination of these methods. Where centrifugation is used, it may be continuous or discontinuous. It can be performed at temperature in the range of from about 20 deg C. to about 40 deg C. for from about 20 minutes to about 30 minutes under a centrifugal force of from about 20,000 Z to about 32,000 Z. In some embodiments, the separation step 24 is repeated more than once.

During the separating step it is possible to remove the fat from the soluble components by using for example a 3-way decanter or a 3-way separator.

Freezing (227)

The insoluble material 226 obtained after separation is subsequently frozen 227. The freezing step can be achieved by any means. For example, the insoluble material 226 can be placed in a container and put in a freezer or in contact with a freezing substance (e.g. liquid nitrogen, dry ice, freezing gas, freezing aerosol). The freezing should render the insoluble material 226 solid throughout. It is within practices of the skilled person to achieve an insoluble material 226 which is frozen throughout using known techniques.

The insoluble material 226 may be frozen 227 to any temperature at 0 deg C. or below i.e. between 0 deg C. and −273.15 deg C. For example, it may be frozen to 0, −1, −2, −5, −10, −15, −20, −25, −30, −35 −40 deg C., or to a temperature in a range between any two of the aforementioned values.

Shock Heating (210)

After freezing 227, the frozen residue 228 so produced is subject to a heat shock 210 by contacting with hot aqueous solution. This is generally performed by immersion of the frozen residue 228 in hot aqueous solution. The frozen residue 228 is rapidly liquefied, resulting in a further treatable suspension 211.

The aqueous solution is defined above. Preferably it is devoid of additional compounds i.e. it may be distilled water, double distilled water, or purified distilled water.

The temperature of the water, sufficient to induce a shock effect is generally above 70 deg C., although there are also results with water at room temperature. According to one aspect of the invention, the temperature of the hot aqueous solution is equal to or greater than 70, 75, 80, 85, 90, 95, 96, 97, 97, 99, 100 deg C. or a value in the range between any two of the aforementioned values. Preferably, the temperature is between 85 and 100 deg C, preferably it is about 99 deg C. The step is normally performed at a pressure of 1 atmosphere, though it is within the scope of the invention to perform the step under reduced or increased pressure. The heat shock 210 can be allowed to continue until the temperature of the water has stabilised. Generally, the heat shock will be complete in less than 1 hour. According to one aspect of the invention, the heat shock 210 proceeds for less than 0.25, 0.5, 0.6, 0.7, 0.8, 0.9, 1, 2, 3, 4, 5, 6, 7, 8, 9, 10 hours, or for a period in a range between any two of the aforementioned values. Preferably, the heat shock 210 proceeds less than 30 minutes.

The ratio between the mass of frozen residue 228 and mass of hot aqueous solution should be less than 1 i.e. there is an excess of hot aqueous solution. According to one embodiment of the invention, this ratio is less than or equal to 0.001, 0.003, 0.006, 0.01, 0.02, 0.04, 0.6, 0.08, 0.1, 0.2, 0.4, 0.8 or a value in the range between any two of the aforementioned values. Preferably it is between 0.1 and 0.5.

After heat shock, a further treated suspension 211 results which is subject to a separation 24 as described above.

Additional Steps

The suspension 211 obtained in step 5) may optionally be subjected to further enzymatic treatment 22' in order to increase the yield of soluble parts 25'. This is depicted in FIG. 2 as the hatched lines of route 213a.

Thus, according to one embodiment of the invention, the method further comprises the steps of:
  5a) Treating the further treated suspension 211 with one or more degrading enzymes to obtain a further treated suspension 211,
  5b) Optionally repeating step 5a) at least once.

Alternatively, or in addition, the further treated suspension 211 may optionally be subjected to further enzymatic treatment 22', optional ultrasonic 217, separation 24, freezing 27, and heat-shock 210 treatments, in order to increase the yield of soluble parts 25, 25'. This is depicted in FIG. 2 as the hatched lines route 213b. Note the ultrasonic treatment is not depicted in this route, but may be applied to the further treated suspension 211 before during or after enzymatic treatment 22'.

Thus, according to one embodiment of the invention, the method further comprises the steps of:
  5a) Treating 22' the further treated suspension 211 with one or more degrading enzymes,
  5b) Repeating 213b, at least once, steps 3) to 5a) using the further treated suspension 211 of step 5a).

The suspension may be prepared as described above in the case of cocoa powder. The freezing, heat shock, enzymatic treatment, ultrasonic treatment and separation steps may be performed as already mentioned herein.

Should the two schemes described above be implemented together in a method of the invention, they may be applied consecutively.

Method According to a Third Aspect

Figure 3:
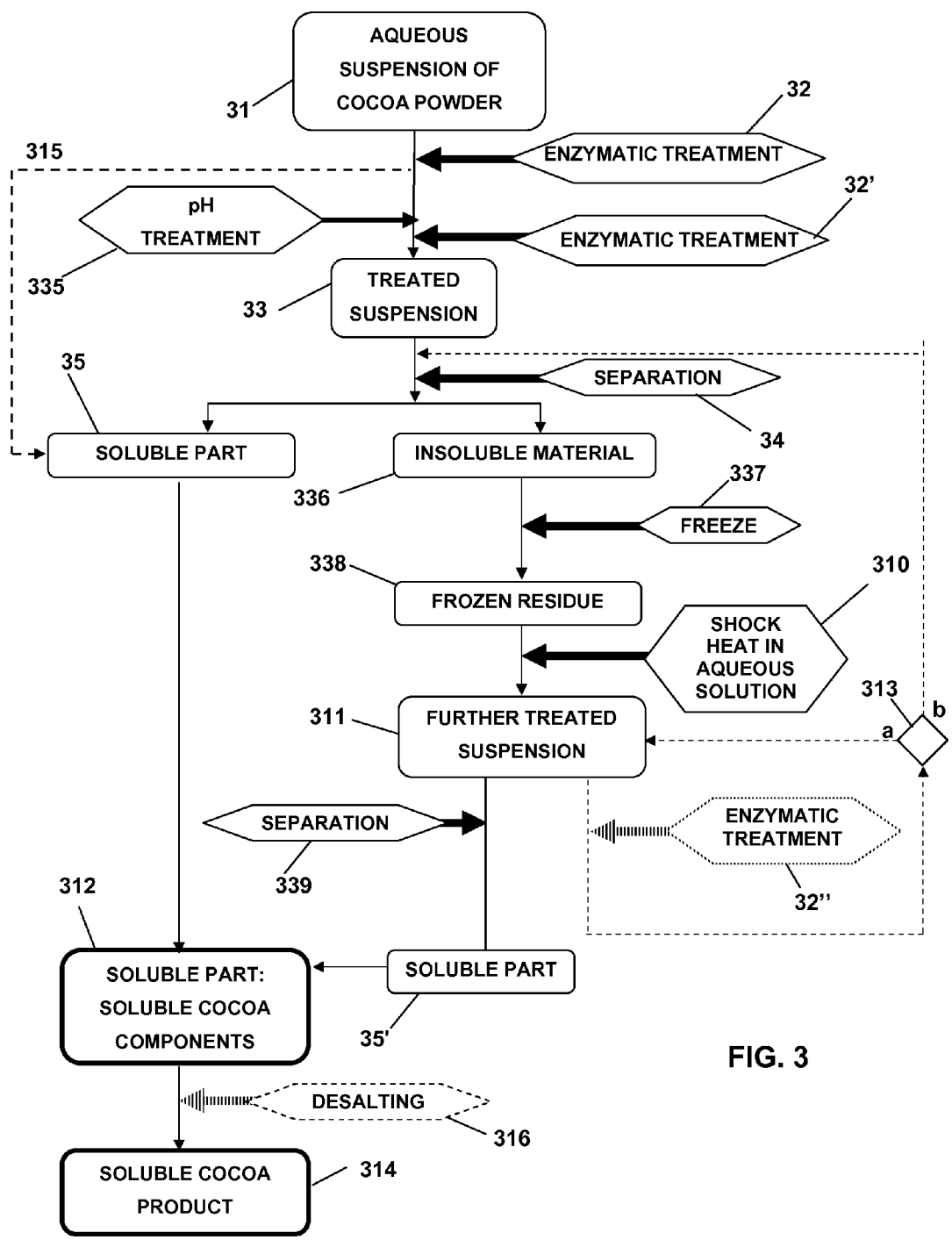
FIG. 3 is a flow chart showing steps of a method according to a third aspect of the present invention.

With reference to FIG. 3, a method according to a second aspect of the present invention is illustrated. The method for producing a soluble cocoa product from cocoa powder comprises the steps:
  a) preparing an aqueous suspension of cocoa powder 31,
  b) treating said suspension with one or more degrading enzymes 32,
  c) submitting 33 the suspension obtained in step b) to a pH treatment 335 comprising treating said suspension for at least 2 hours at a suitable pH, a temperature of at least 100° C., and a pressure which is at least 1 bar higher than the applied pressure,
  d) optionally bringing the pH of the suspension obtained in step c) to a pH value corresponding with the pH of the suspension obtained in step a),
  e) treating 32' the suspension obtained in step c) or d) with one or more degrading enzymes,
  f) separating 34 the suspension 33 obtained in step e) into insoluble material 336 and a soluble part 35, whereby said insoluble material is subjected to the steps of:
    i. Freezing 337 the insoluble material 336,
    ii. Shock heating 310 the frozen insoluble material 338 by contact with hot aqueous solution, to obtain a further treated suspension 311,
    iii. Separating 339 the further treated suspension 311 into insoluble material and a soluble part 35', and
  g) Obtaining soluble cocoa components 312 from the soluble parts 35, 35'.

This method may further comprise the step of desalting 316 the soluble part containing the soluble cocoa components 312, e.g. by means of ion exchange, to remove salts Enzymatic Treatment (32,32')

The method according to the third aspect also comprises a first enzymatic treatment 32 which is carried out on the above-described aqueous suspension of cocoa powder obtained in step a).

The present method according to the third aspect further comprises a second enzymatic treatment 32' which is carried out on the above-described suspension of cocoa powder that has been subjected to a first enzymatic treatment 32 and a pH treatment and that is obtained in step c) or d) of the present method.

The enzymatic treatment steps 32, 32' are carried out as explained for the enzymatic treatment steps 2, 4 of the method according to a first aspect of the invention (see above).

In some embodiments, the enzymatic treatment is repeated more than once e.g. again 32" after the freezing 337 and heat shock 310 steps.

pH-Pressure Treatment (335)

The suspension that has been enzymatically treated with starch degrading enzyme(s) 32 is submitted to a pH treatment.

The pH-pressure treatment 335 is carried out as explained for the pH-pressure treatment 3 of the method according to a first aspect of the invention (see above).

Heat Shock Treatment

The suspension obtained in step b) can be submitted to a heat shock treatment before being submitted to the above-described pH treatment 335. Heat shock treatment is preferably carried out after the first enzymatic treatment 32. The heat shock treatment is preferably carried out as explained for the method according to a first aspect of the invention (see above). After heat shock, the treated suspension is submitted to a pH treatment 335 as described above.

Ultrasonic Treatment

A step of ultrasonic treatment can optionally be applied to the aqueous suspension of cocoa powder 1. It can be applied before, during or after, but preferably during the pH treatment 335 of step c). This technique does not cause any taste changes to the product or significant molecular changes. The ultrasonic treatment is preferably carried out as explained under the method according to a first aspect of the invention.

Separation (34)

The treated suspension 33 is separated 34 into insoluble material 336 and a soluble part 35. The soluble part 35 comprises the soluble cocoa components 312 together with the aqueous solution. The separation 34 is carried out as explained for the separation 6 of the method according to a first aspect of the invention (see above).

Freezing (337)

The insoluble material 336 obtained after separation 34 is subsequently frozen 337. The freezing step can be achieved by any means. For example, the insoluble material 336 can be placed in a container and put in a freezer or in contact with a freezing substance (e.g. liquid nitrogen, dry ice, freezing gas, freezing aerosol). The freezing should render the insoluble material 336 solid throughout. It is within practices of the skilled person to achieve an insoluble material 336 which is frozen throughout using known techniques. The insoluble material 336 may be frozen 337 to any temperature at 0 deg C. or below i.e. between 0 deg C. and −273.15 deg C. For example, it may be frozen to 0, −1, −2, −5, −10, −15, −20, −25, −30, −35 −40 deg C., or to a temperature in a range between any two of the aforementioned values.

Heat Shock Treatment (310)

After freezing 337, the frozen residue 338 so produced is subject to a heat shock 310 by contacting with hot aqueous solution. This is generally performed by immersion of the frozen residue 338 in hot aqueous solution. The frozen residue 338 is rapidly liquefied, resulting in a further treatable suspension 311. The heat shock treatment 310 is carried out as explained for the heat shock treatment 210 of the method according to a second aspect of the invention (see above). After heat shock, a further treated suspension 311 results which is subject to a separation 34 as described above.

Additional Steps

The suspension obtained after step b) of the present method may optionally be separated into insoluble material and a soluble part 35. This is depicted in FIG. 3 as the hatched line 315. The soluble part 35 comprises the soluble cocoa components 312 together with the aqueous solution. The separation is performed in a similar way as explained for the method according to a first aspect of the invention. The residue that is obtained after this separation can be re-dissolved and further treated according to the present method. The soluble part obtained after treatment of such residue according to steps of the present method can then be combined with the soluble parts that have been separated in an earlier stage of the process.

In another embodiment, the suspension 311 obtained in step ii) may optionally be subjected to further enzymatic treatment 32″ in order to increase the yield of soluble parts 35′. This is depicted in FIG. 3 as the hatched lines of route 313a.

Thus, according to one embodiment of the invention, the method further comprises the steps of:
ii.1) Treating the further treated suspension 311 with one or more degrading enzymes to obtain a further treated suspension 311,
ii.2) optionally repeating step ii.1) at least once.

Alternatively, or in addition, the further treated suspension 311 may optionally be subjected to further enzymatic treatment 32″, optional ultrasonic, separation 34, freezing 337, and heat-shock 310 treatments, in order to increase the yield of soluble parts 35, 35′. This is depicted in FIG. 3 as the hatched lines route 313b. Note the ultrasonic treatment is not depicted in this route, but may be applied to the further treated suspension 311 before during or after enzymatic treatment 32″.

Thus, according to one embodiment of the invention, the method further comprises the steps of:
ii.1) Treating 32″ the further treated suspension 311 with one or more degrading enzymes, and
ii.2) Repeating 313b, at least once, steps f) to ii.1) using the further treated suspension 311 of step ii.1).

The suspension may be prepared as described above in the case of cocoa powder. The freezing, heat shock, enzymatic treatment, ultrasonic treatment and separation steps may be performed as already mentioned herein.

Should the two schemes described above be implemented together in a method of the invention, they may be applied consecutively.

Soluble Part Containing Soluble Cocoa Components

The soluble parts 7, 25, 25′, 35, 35′, resulting from one, two or more separations contain the soluble cocoa components 10, 212, 312.

The obtained product 10, 212, 312 can be used as a material in further processes. It may be freeze-dried, roller-dried or spray dried which procedures are commonly known in the art. The freeze-dried, roller-dried or spray dried product is then a (powdery) soluble cocoa product 14, 214, 314.

Optionally, the soluble part may have undergone desalting 13, 216, 316, e.g. by passing the soluble parts through an ion exchange device. The obtained product is then a (optionally desalted) soluble part containing soluble cocoa components. This material may then be freeze-dried, roller-dried or spray dried which procedures are commonly known in the art. The obtained freeze-dried, roller-dried or spray dried product is then preferably a (powdery) soluble cocoa product (14, 214, 314).

Generally, the spray drying is carried out under usual conditions, with for example a hot-air temperature of between 150 and 270 deg C., and exhaust air temperature of from 80 to 130 deg C.

The particles obtained by spray drying have a substantially spherical shape. The average particle size is from about 20 to 100 micrometers. Generally, when the average particle size is less than 20 micrometers, the solubility is poor, and when it is more than 100 micrometers, the spray-drying efficiency is reduced to an uneconomical level.

The particles may be further subjected to granulation into a granular form of a suitable size. By the granulation, the solubility in water or hot water is further increased, whereby cocoa can be prepared more easily. Conventional granulation methods may be used, but the fluidized bed granulation and agitation granulation methods are especially preferred.

Soluble Cocoa Product

The soluble cocoa product is herein also denoted as "soluble" cocoa powder, in order to distinguish from the "cocoa powder" used as starting material in the present methods (see also above).

According to the invention a soluble cocoa product can be obtained having the following characteristics.

Cocoa powder that is put into and treated according to any of the present methods is made more soluble. Surprisingly, the yield, i.e. the percentage of solubilised starting material, of soluble cocoa exceeds levels from those obtained using standard methods, and with the application of only simple steps. The use of water, especially distilled water, means there is hardly any impact on taste. Similarly, freezing is a natural treatment that appears to solubilise the cocoa without the need for chemicals or renaturation.

In a preferred embodiment, the invention relates to a soluble cocoa product having a degree of solubility in a solvent, preferably in a polar solvent, preferably a water-based solvent of at least 50%, and more preferably of at least 70%, and even more preferably of at least 90% and most preferably of between 95 and 100% or even of between 98 and 100%. Preferably, the obtained soluble cocoa product has a solubility comprised between 50 and 100% and preferably a solubility of at least 50, 60, 65, 70, 75, 80, 85, 90, 95, 96, 97, 98, 99, 99.5 or of 100%. The present invention provides a soluble cocoa product wherein the amount of insoluble material is lower than 50 weight %, and preferably lower than 40, 35, 30, 25, 20, 15, 10, 5, 4, 3, 2, 1, or 0.5% by weight. Solubility can be measured as defined above.

In a preferred embodiment, the invention provides a soluble cocoa product, whereby said product is in a dry or lyophilized form, and preferably in the form of granules, pellets, or a powder.

In another preferred embodiment, said soluble cocoa product has a theobromine content lower than 5% by fat-free dry weight (i.e. based on a fat-free dry weight) and a caffeine content lower than 1% by fat-free dry weight (i.e. based on a fat-free dry weight). The soluble cocoa product prepared according to the present invention has (based on a fat-free dry weight) a theobromine content lower than 5 wt % and preferably between 2.5 and 5%, and for instance a theobromine content of 2.5, 3.0, 3.5, 4.0, 4.5, 5.0 wt %. The caffeine content will generally be (based on a fat-free dry weight) lower than 1 wt %, and will preferably be between 0.25 and 0.7%, and for instance a caffeine content of 0.25, 0.30, 0.35, 0.40, 0.45, 0.50, 0.55, 0.60, 0.65, or 0.70 wt %. For example, when cocoa powder is made 75% soluble (i.e. a yield of 75% is obtained or 75 wt % of soluble cocoa components is extracted from a cocoa starting powder) by applying a method of the present invention, fatfree cocoa powder with 3% theobromine will result in soluble cocoa powder with 4% of theobromine. By contrast, the quantity of theobromine in soluble cocoa powder, coming from a cocoa extract obtained with a prior art technique, will contain at least 5% of theobromine (see for instance example 1 and 7). For example, when cocoa powder is made 40% soluble by applying prior art techniques, fatfree cocoa powder with 3% theobromine will result in soluble cocoa powder with 7.5% theobromine.

In accordance with another embodiment, the invention provides a soluble cocoa product having an amount of fat lower than 25 wt %, and for instance lower than 24 wt %, or between 0-20 wt % and for instance between 0-12 wt %, and for instance lower than 10, 8, 5 or 3 wt %. Preferably the fat content of a soluble cocoa product according to the invention is equal to or lower than the fat content of the cocoa starting powder.

In accordance with yet another embodiment, the invention provides a soluble cocoa product wherein proteins in the cocoa starting powder have been degraded to amino acids, peptides, and proteins. Preferably a soluble cocoa product according to the invention has an amount of amino acids, peptides, and proteins (wt % is expressed as % by fat-free dry weight) of between 10 and 40 wt %, and preferably between 12 and 30 wt %, and for instance of 15, 20, 25, or 28 wt %.

In yet another embodiment, the invention provides a soluble cocoa product wherein starch en cellulose in the cocoa starting powder have been degraded to glucose, glucose oligomers and/or dextrines. Preferably a soluble cocoa product according to the invention has an amount of glucose, glucose oligomers and/or dextrines (wt % is expressed as % by fat-free dry weight) comprised between 10 and 60 wt %, and preferably between 15 and 50 wt %, and for instance between 15 and 35 wt % and for instance of at least 10, 15, 20, 25, 30, 35, 40, or 45 wt %.

In yet another embodiment, the invention provides a soluble cocoa product that has an amount of ash (wt % is expressed as % by fat-free dry weight) comprised between 1 and 10 wt % and preferably lower than 8 wt %.

The invention further provides a soluble cocoa product that has an amount of pentosanes (wt % is expressed as % by fat-free dry weight) comprised between 3 and 10 wt % and preferably between 3.5 and 5 wt %.

The invention further provides a soluble cocoa product that has an amount of pectines (wt % is expressed as % by fat-free dry weight) comprised between 0.1 and 3 wt % and preferably between 0.5 and 2 wt %.

The invention further provides a soluble cocoa product that has an amount of polyphenols (wt % is expressed as % by fat-free dry weight) comprised between 1 and 24 wt % and preferably between 5 and 13 wt %, and for instance comprised between 7 and 13 wt %.

The invention further provides a soluble cocoa product that has an amount of organic acids (wt % is expressed as % by fat-free dry weight) comprised between 1 and 5 wt % and preferably between 2 and 4 wt %.

A soluble cocoa product according to the present invention preferably has an amount of fosfatides (wt % is expressed as % by fat-free dry weight) which is lower than 1 wt %.

The amount of moisture in the present cocoa product can be adjusted according to techniques well known to the skilled person, and (at least partly) depending on the moisture content of the cocoa starting powder.

In another embodiment the invention provides a soluble cocoa product obtainable by any of the methods as disclosed herein.

In this context, it should be noted that the present soluble cocoa product obtained or obtainable by carrying out a method according to the invention differs from defatted cocoa powder, known in the art, in that it does not form a sediment when dissolved in a suitable solvent, e.g. water or milk. The present invention thus may provide a (at least partially) defatted soluble cocoa product which has not the prior art drawback of sedimentation of known defatted cocoa powders.

Beverage Pouch, Pre-Concentrate and Beverages

In one embodiment, the invention provides a pre-concentrate comprising a soluble cocoa product according to the present invention.

For instance, the invention provides a pre-concentrate comprising a soluble cocoa product as defined herein, whereby said pre-concentrate is in a liquid form, preferably in the form of a syrup or solution, or in a solid form, preferably in the form of a dry or lyophilized (freeze-dried) form, and for instance in the form of granules, pellets, or a powder, and whereby said pre-concentrate preferably comprises between 0.1 and 100 wt %, and preferably between 0.1 and 50 wt % of said soluble cocoa product.

In one embodiment, the invention relates to a pre-concentrate, preferably a pre-concentrate in a liquid form (e.g. a syrup) comprising a mixture of:
- a soluble cocoa product according to the invention, preferably in an amount of between 0.1 and 50 wt %
- a sugar, such as e.g. sucrose, dextrose, maltose, fructose, lactose, and brown and invert sugars, alone or in combination, preferably in an amount of between 0.1 and 75 wt % and preferably of between 0.1 and 50 wt % and/or a sweetener, preferably in an amount of between 0.0001 and 25 wt %
- optionally a suitable amount of milk or (optionally gaseous) water.

In another embodiment, the invention relates to a pre-concentrate, preferably a pre-concentrate in a solid form, and even more preferred in a freeze-dried form, comprising a mixture of
- a soluble cocoa product according to the invention, preferably in an amount of between 0.1 and 50 wt %
- a sugar, such as e.g. sucrose, dextrose, maltose, fructose, lactose, and brown and invert sugars, alone or in combination, preferably in an amount of between 0.1 and 75 wt % and preferably of between 0.1 and 50 wt % and/or a sweetener, preferably in an amount of between 0.0001 and 25 wt %
- optionally a suitable amount of milk.

The present pre-concentrate can be used as a base for preparing a drink, by adding water, milk or an alcohol-water mixture. In an example, a drink can be prepared by combining between 10 and 45 wt % of a pre-concentrate as defined herein with 55 to 90 wt % of a suitable solvent such as water, milk or an alcohol-water mixture.

In another embodiment, the invention provides a beverage pouch comprising a soluble cocoa product or a pre-concentrate according to the invention. One application for the invention is the treated cocoa product, or a pre-concentrate thereof for use in a filter pouch for beverage purposes. This pouch comprises the cocoa product or a pre-concentrate and can be used to make a chocolate drink when hot water or milk is poured on it. The same system is already being used in coffee and tea pouches e.g. pre-prepared coffee filters and pads. The reason why cocoa pouches have not been manufactured up to now is that cocoa does not sufficiently dissolve to be used in the same way as coffee or tea-pouches. Wet cocoa powder forms clumps meaning it cannot pass through the patch. The present invention solves this problem.

In another embodiment, the invention relates to a drink or beverage containing a soluble cocoa product or a pre-concentrate according to the invention. The terms "drink" and "beverage" are interchangeably used herein.

Generally, the soluble cocoa product concentrations in the final beverage are about 1% to about 35%, or about 1% to about 20%, or about 1% to about 10%, or about 1% to about 5%. It will be understand that many other ranges or specific beverages can be selected and used. The drinks or beverages according to the present invention have an improved taste. Furthermore, a cocoa product contained in said beverages will not sediment.

Beverages according to the present invention may comprise hot or cold drinks. In preferred and advantageous embodiments, the beverages are selected from the group comprising but not limited a water-based or milk-based drink; a carbonated drink; a reconstituted beverage, etc. . . . . .

In one embodiment, a soluble cocoa product or pre-concentrate as defined herein can be added to water or milk to produce a water-based or milk-based drink.

In one embodiment the invention provides a beverage which is a carbonated drink comprising a soluble cocoa product as defined herein or a pre-concentrate in liquid or solid form as defined herein and a suitable amount of carbonated water and/or carbon gas. Preferably, the invention provides a beverage which is a carbonated drink comprising a pre-concentrate, and preferably a liquid pre-concentrate, as defined herein and carbonated water. In another embodiment, the invention provides a beverage which is a carbonated drink comprising a pre-concentrate, and preferably a liquid pre-concentrate as defined herein, and a suitable amount of carbon gas ($CO_2$). In another embodiment, the invention provides a beverage which is a carbonated drink and which comprises a suitable amount of a soluble cocoa product as defined herein and a suitable amount of carbonated water and/or a suitable amount $CO_2$ gas.

In one embodiment the invention provides a beverage which is a reconstituted drink comprising a soluble cocoa product as defined herein or a pre-concentrate in solid, and preferably a freeze-dried form as defined herein and a suitable amount of water and/or milk. A "reconstituted drink" as defined herein as a drink which is obtained when reconstituting a preferably freeze-dried cocoa product or pre-concentrate in water and/or milk.

Beverages or pre-concentrates as defined according to the present invention may optionally contain further ingredients, such as but not limited to vitamins, flavoring agents, coloring agents and/or extracts, e.g. plant and/or fruit extracts.

Available nutritive or carbohydrate sweeteners that can be selected and used in a pre-concentrate or a beverage according to the present invention include but are not limited to for instance sucralose, aspartame, saccharin, stevioside, and preferably comprise sucralose. The beverages, alone or in any combination, include sucrose, dextrose, fructose, liquid fructose, lactose, maltose, glucose, trehalose, oligofructose, inulin, agave syrup, corn syrup, invert sugar, honey, cane syrup, maple sugar, brown sugar, and molasses, for example. Furthermore, artificial or non-nutritive sweeteners can be used in the invention, or in total or partial replacement of nutritive sweeteners, to produce low calorie or low carbohydrate products or sugar-free products. Examples of sweeteners include, but are not limited to, Acesulfame potassium (Ace-K), sucralose, maltitol, xylitol, erythritol, mannitol, sorbitol, lactitol, isomaltulose, powdered hydrogenated glucose syrup, aspartame, neotame, cyclamate, saccharine, glycyrrhizine, dihydrochalcones, stevisoide, thaumatin, monellin, neohesperidine, any of the polyol compounds, and any available natural products of plants, such as glycosides and specifically stevioside and rebaudioside A, and any combination of two or more of these sweeteners. A preferred polyol or sugar alcohol is xylitol, but any others can be selected, alone or in any of various combinations possible, from, for example, erythritol, mannitol, sorbitol, and maltitol. Sugar substitutes, as known and available in the art, can also be used, alone or in various combinations.

Vitamins that may be used in a beverage or pre-concentrate according to the present invention include but are not limited to for instance vitamin C, vitamin D or vitamin E.

Extracts, e.g. plant or fruit extracts, that may be used in a beverage or pre-concentrate according to the present invention include but are not limited to for instance juices, concentrates, or extracts, as well as any combination of two or more thereof, such as citrus fruits; berries; orange; lemon; lime; tangerine; mandarin; grapefruit; acerola; grape; pear; passion fruit; pineapple; banana; apple; cranberry; cherry; raspberry; chokeberry; grapeseed; peach; plum; grape; currant; black currant; cranberry; blackberry; blueberry; pomegranate; acai; noni; elderberry; goji berry; rosehips; bilberry; hawthome berry; ginko; goru kola; rooibos; boysenberry; catuaba; horny goat weed; yohimbe; damiana; red raspberry leaf; vitex berry; blessed thistle; wolfberry; strawberry; mirabelle; watermelon; honeydew; cantaloupe; mango; papaya; botanical flavors derived from cola; tea; white tea; green tea; coffee; vanilla; almond; vegetables; tomato; cabbage; celery; cucumber; spinach; carrot; lettuce; watercress; dandelion; rhubarb; beet; cocona; cocoa; guava; Japanese knotweed; han guo, green tea, white tea, and any available tea blends, grapeseed, blueberries, etc. . . . . .

Flavoring agents that may be used in a beverage or pre-concentrate according to the present invention include but are not limited to flavor agents and beverage flavor agents known or available and for instance vanillin, coumarin, and other compounds available in the art.

Coloring agents that may be used in a beverage or pre-concentrate according to the present invention include but are not limited to such as e.g. β-carotene, annatto, preservatives such as e.g. sodium- or calciumpropionate, sulphite ammonia caramel, or any combinations thereof.

Additional ingredients may still be added to a beverage or pre-concentrate according to the present invention including but are not limited to caffeine, guarana, taurine, etc. . . . . .

Some of the preferred beverages and pre-concentrates are low calorie products, and thus sugar substitutes and sweeteners are preferred, especially in producing products with a per serving calorie count of less than or about 100 calories, or less than or about 70 calories, or less than or about 60 calories, or less than or about 50 calories, or less than or about 40 calories, or less than or about 30 calories, or substantially zero calories.

Preservatives and similar functional compounds and compositions and stabilizing agents, emulsifiers or beverage stabilizers, can also be used in the beverages and pre-concentrates as defined herein, or in mixing pre-concentrates into a ready-to-drink beverage.

Beverages according to the present invention can be prepared by techniques which are well known in the art.

Applications

This soluble cocoa powder or cocoa product can be used in numerous applications, in particular in all applications where cocoa powder or other vegetable components containing plant cells are required to be more soluble in aqueous environments, such as in chocolate milk and other beverages, ice-creams and deserts. The sedimentation of insoluble cocoa material can be greatly reduced and even avoided.

A cocoa product prepared according to the method is made more soluble with fast and inexpensive additional steps. Surprisingly, the yield (the percentage of solubilised starting material) of soluble cocoa exceeds levels obtained using standard methods, and with the application of only simple steps, and without the need of having to repeat one or more method steps. The use of water, especially distilled water, means there is hardly any impact on taste. Similarly, freezing is a natural treatment that appears to solubilise the cocoa without the need for chemicals or renaturation. Theoretically, it could be possible to make defatted cocoa powder 100% soluble in aqueous solutions.

The present process can also be applied to other industries where a soluble part needs to be extracted from cellular material. The present invention can in fact be used in any application where plant cells have to be disrupted. The present method may for instance be applied to solubilize other types of plant material such as fruits and vegetables. For example, fruit juices and vegetable juices can be readily prepared from a powdered form prepared according to the present invention.

Another application is the paper industry. This technique can be used to make more excellent surface smoothness, printing suitability, liquid paper.

EXAMPLES

The invention is illustrated with the following non-limiting examples.

Example 1

Solubilisation of Cocoa Powder Using Only Enzymatic Treatment (Prior Art)

Standard cocoa powder is treated enzymatically for three days. 10 kg of medium alkalised cocoa powder (commonly used in the industry) is suspended in 40 kg of water in a batch reactor with stirring. The temperature is increased to 80° C., the pH is set to 5.8 with HCl and 10 g of termamyl classic (Novozymes) is added. The amylase enzyme treats the cocoa powder for 2 hours under continuous mild stirring. Then, the temperature is lowered to 45° C. and 10 g of Gammazym (endo-protease, AB enzymes) is added. After again 2 hours of reacting while stirring, the temperature is raised again to 67.5° C., the pH to 7.0 with NaOH. 10 g of Corolase (exopeptidase, AB enzymes) is added and treated the cocoa for another 2 hours. Then, the temperature is set at 60° C. and pH 5.5. 10 g of celluclast, 10 g of fungamyl and 10 g of ultraflo (all Novozymes) are added. 18 hours later pectines and viscozyme (both Novozymes) are added after lowering the temperature to 37° C. and the pH to 5 with HCl. After another 2 hours, the suspension is heated up to 80° C. for 2 hours. After stirring the suspension at high speed for homogenizing, a sample is taken of about 100 ml.

A measured amount is dried in an oven at 105° C. overnight to analyze the dry matter content. Another weighed amount of this sample is filtered over a Whatmann filter with a pore size between 5 and 12 micrometers. The filtrate is also dried in an oven overnight at 105° C. These analyses are repeated 3 times. The results clearly indicate that 45% of the cocoa powder passes through the filter, indicating a 55% insoluble cocoa material that is not solubilised by the enzymes. In these analyses it is taken into account that a few soluble enzymes and NaOH and HCl are added to the suspension.

For a composition of a cocoa product obtained in the present example, reference is made to example 7.

Example 2

Solubilisation of Cocoa Powder—Effect of Contact Time

Different cocoa suspensions (20% solution) were prepared. The suspensions were brought to a pH of 12 and maintained at 120° C. and the applied (ambient) pressure was increased with 1 bar extra pressure for 0, 30, 60, 120, 180 minutes. After this treatment, the pH was lowered to 5.5 and the suspensions were treated at 55° C. and for 2 hours with cellulase and pectinase (both applied at 0.1% w/w, Novozymes). Subsequently the suspension was treated for one hour with an amylase and for two hours with a protease, at optimal temperatures (termamyl from Novozymes at 80°

C. and Neutrase from Novozymes at 45° C.). Solubilisation was measured by looking at the dry weight content of the filtrate after filtration.

Visually, there was an immediate result. The prepared samples produced a great amount of foam after filtration, indicating that proteins had been liberated by the treatment and were present in the filtrate. The longer the applied contact time, the more foam was produced. Foam was not produced in the sample that had not been treated at a high pressure, but that had been maintained at a pH of 12.

Table A provides an overview of the solubilisation (i.e. the percentage of solubilised starting material, in function of the applied contact time.

TABLE A

| contact time (minutes) | Solubilisation (yield: %) |
|---|---|
| 0 | 45 |
| 30 | 51.4 |
| 60 | 53.4 |
| 120 | 58.5 |
| 180 | 62.6 |

Application of an elevated pH (12) has a small impact on the solubilisation of the cocoa powder. Application of an enzymatic treatment without pH treatment permits to provide a yield of 45% (see also example 1). However, in combination with an increased temperature and a pressure treatment, an important increase of the solubilisation after the enzymatic treatment can be obtained.

Example 3

Solubilisation of Cocoa Powder—Effect of the pH

Four cocoa suspensions (10% w/w) were prepared. The suspensions were brought to a pH of 9, 10, 11 or 12 and maintained at 120° C. and 1 extra bar pressure for 180 minutes. After this treatment, the pH was lowered to 5.5 and the suspensions were treated at 65° C. and for 3 hours with cellulase (celluclast from Novozymes applied at 0.1% w/w). Table B provides an overview of the solubilisation in function of the applied pH.

TABLE B

| pH | solubilisation (%) |
|---|---|
| 9 | 29.8 |
| 10 | 38.5 |
| 11 | 43.9 |
| 12 | 65.8 |

These results indicate that even without the application of proteases, a solubilisation of 65% can be achieved; indicating that cocoa proteins are (at least partly) water-soluble or that the proteins are not affected by proteases. The pH is an important factor for making cocoa powder more water-soluble.

Example 4

Solubilisation of Cocoa Powder—Effect on Protein Content of the Obtained Soluble Cocoa Product A cocoa suspension (10% w/w) was prepared. The suspension was brought to a pH of 12 and maintained at 120° C. and 1 extra bar pressure for 180 minutes. After this treatment, the pH was lowered to 5.5 and the suspension was divided in two samples. One sample was first treated with a protease and then with a cellulase, the other sample was first treated with a cellulase and then with a protease. Treatment with the cellulase was done at a temperature of 60° C. for 3 hours using 0.1% w/w on the cocoa powder of cellulase (celluclast, Novozymes). Treatment with the protease was done at a temperature of 50° C. for 3 hours using an amount of protease of 0.1% w/w (gammazym, AB enzymes).

Results of this experiment indicated that a pH pressure treatment in accordance with the present invention increased solubilisation of the cocoa powder when applying a sequential enzymatic treatment of cellulase first, followed by protease. An enzymatic treatment comprising first using a protease followed by using a cellulase, did not increase solubilisation of the cocoa powder.

These results indicate that the sequence of applying enzymes in the enzymatic treatment is of importance in the present method.

Example 5

Solubilisation of Cocoa Powder Using a Method According to the Invention

A 20% w/w suspension of cocoa powder in mineral water is prepared by homogenisation at room temperature.

The suspension is treated with alpha-amylase (0.1% w/w dry solids termamyl, Novozymes) at 85 deg C. for 2 hours, while stirring the suspension. After this enzyme step, a sample reveals that the cocoa powder contains between 30 and 40% soluble components.

The suspension is filtered and the insoluble material together with the filter membrane placed in a freezer at −25 deg C. for about an hour. Then, the filter, together with the frozen insoluble material, is immersed in double distilled water (ddH$_2$O) at a temperature of 99° C. to create a heat shock-effect. The insoluble material is gently removed from the filter with water, to create a suspension.

This suspension is filtered again, to measure the amount of soluble material in the filtrate. Solubilisation increases to between 40 and 50%.

The residue, that is obtained after amylase treatment and heat-treatment, was re-dissolved and was further treated at a pH of 12 for 3 hours at 120° C. and 1 extra bar pressure. Subsequently the pH of the treated suspension was lowered to a pH of 11.5 to 10.5. Subsequent enzymatic treatment comprised application of enzymes such as cellulase (celluclast Novozymes), proteases (gammazym AB enzymes) in a sequential mode, as described above. A soluble cocoa product was obtained showing 95.5% solubility.

Example 6

Solubilisation of Cocoa Powder Using Enzymatic Treatment Combined with Freezing and Shock Heat Treatment A 20% w/w suspension of cocoa powder in mineral water is prepared by homogenisation at room temperature.

The suspension is treated with alpha-amylase (0.1% w/w dry solids) at 85 deg C. for 2 hours, while stirring the suspension. After this enzyme step, a sample reveals that the cocoa powder contains between 30 and 40% soluble components.

The suspension is filtered and the insoluble material together with the filter membrane placed in a freezer at −25 deg C. for about an hour. Then, the filter, together with the frozen insoluble material, is immersed in double distilled water (ddH$_2$O) at a temperature of 99° C. to create a heat shock-effect. The insoluble material is gently removed from the filter with water, to create a suspension.

This suspension is filtered again, to measure the amount of soluble material in the filtrate. Solubilisation increases to between 40 and 50%.

The insoluble material on the filter is then re-suspended in mineral water, and treated with cellulase (celluclast Novozymes) at the optimal temperature and pH. In this case; 65° C. and pH 5.2. Filtering and drying the suspension shows that solubilisation rises by 10 to 20% as shown by evaporating the filtrate to a dry mass. The remaining insoluble material on the filter is re-suspended and treated again enzymatically, by using glucanase, pentosonase, carbohydrase, hemicellulase, xylanase and pectinase. All of the enzymes are used separately (0.1% w/w dry solids) at the optimal temperature and pH. After filtering and drying again, the yield achieved is between 70 and 80%.

Example 7

Soluble Cocoa Product

Tables C provides an example of a composition and characteristics of
- an cocoa powder used as starting material in a method according to the present invention. The illustrated powder has a solubility of 20%.
- an example of a soluble cocoa product obtained with a prior art method. This soluble cocoa product is obtained as a result of a 45% solubilisation of a standard cocoa powder when carrying out a prior art method (see example 1). The resulting cocoa product is completely soluble in water or milk (solubility=100%).
- an example of a soluble cocoa product obtained when carrying out a method according to a first aspect of the present invention. This soluble cocoa product is obtained as a result of a 100% solubilisation of a standard cocoa powder, i.e. when carrying out a method according to a first aspect of the present invention with a yield of 100%. The resulting cocoa product is completely soluble in water or milk (solubility=100%).

The amount of fat is expressed in wt %.
Amounts of other components are expressed in % by fat-free dry weight, i.e. by weight on a dry fat-free basis.

TABLE C

| Starting product cocoa powder | End product cocoa powder 45% yield (prior art—see example 1) | End product cocoa powder 100% yield |
|---|---|---|
| 10-12 w % fat | 0-27 w % fat | 0-12 w % fat |
| 28 wt % proteins | 12 wt % proteins | 28 wt % amino acids, peptides, proteins |
| 6 wt % ash | 11 wt % ash | 6 wt % ash |
| 2.5 wt % sugars | 5 wt % sugars | 2.5 wt % sugars |
| 14.5 wt % starch | 31 wt % glucose and dextrines (when amylase applied in the method) | 14.5 wt % glucose and dextrines |
| 3.5 wt % pentosanes | 7-8 wt % pentosanes | 3.5 wt % pentosanes |
| 22.5 wt % cellulose | Cellulose is discarded with the insoluble fraction and not degraded into glucose or glucose oligomers | 22.5 wt % glucose/glucose oligomers |
| 0.5-2 wt % pectines | 1 wt % pectines | 0.5-2 wt % pectines |
| 7-13 wt % polyphenols | 10 wt % polyphenols | 7-13 wt % polyphenols |
| 3-4 wt % organic acid | 6 wt % organic acid | 3-4 wt % organic acid |
| 3 wt % theobromine | 6-7 wt % theobromine | 3 wt % theobromine |
| 0.4 wt % caffeine | 0.8-0.9 wt % caffeine | 0.4 wt % caffeine |
| 0.8 wt % fosfatides | 1.5-1.6 wt % fosfatides | 0.8 wt % fosfatides |

Example 8

Beverage Containing a Soluble Cocoa Product or Pre-Concentrate According to the Invention Hereunder a number of beverages and compositions thereof containing a soluble cocoa product according to the present invention are illustrated.

Product 1 is a carbonated drink (cocoa cola). This drink is prepared by mixing:
- ⅓ of a syrup (pre-concentrate) comprising 9 wt % of a soluble cocoa product according to the invention, 21 wt % glucose, 40% sugar, 30% water and 0.1 wt % vanillin, and
- ⅔ of carbonated water.

Product 2 is an a carbonated drink which is prepared by
- making a solution comprising 9 wt % of a soluble cocoa product according to the invention, 21 wt % glucose, 40% sugar, 30% water and 0.1 wt % vanillin, and
- adding a suitable amount of CO$_2$ to this mixture.

Product 3 is a reconstituted cocoa drink comprising a freeze-dried mixture of soluble cocoa product according to the invention, a sweetener (e.g. sucralose) and milk. A drink is prepared by dissolving said freeze-dried mixture in hot or cold water. The resulting drink contains for instance 2% (w/v) soluble cocoa product and sweetness compared to 9% sugar.

Product 4 is a reconstituted cocoa drink comprising a freeze-dried mixture of soluble cocoa product according to the invention and a sweetener (e.g. sucralose). A drink is prepared by dissolving said freeze-dried pre-concentrate in hot or cold milk. The resulting drink contains for instance 2% (w/v) soluble cocoa product and sweetness compared to 9% sugar.

In conclusion, in a first aspect, the invention relates to a method for producing a soluble cocoa product from cocoa powder comprising the steps:
 a) preparing an aqueous suspension of cocoa powder,
 b) treating said suspension with one or more degrading enzymes,
 c) submitting the suspension obtained in step b) to a pH treatment comprising treating said suspension for at least 2 hours at a pH of at least 7, a temperature of at least 100° C., and a pressure which is at least 1 bar higher than the applied pressure,
 d) optionally bringing the pH of the suspension obtained in step c) to a pH value corresponding with the pH of the suspension obtained in step a),
 e) treating the suspension obtained in step c) or d) with one or more degrading enzymes,
 f) separating the suspension obtained in step e) into insoluble material and a soluble part, and
 g) obtaining soluble cocoa components from the soluble parts.

In a preferred embodiment of said method said suspension is prepared by mixing the cocoa powder with a solution comprising salt in a below isotonic concentration.

In another preferred embodiment of said method said suspension is prepared by mixing the cocoa powder with distilled water or double distilled water.

In yet another preferred embodiment of said method said suspension is treated in step b) with one or more starch degrading enzymes.

In another preferred embodiment of said method the applied pressure in step c) is initially comprised between 1 and 1.5 bar and is raised during step c) up to a pressure comprised between 2 to 5 bar.

In another preferred embodiment of said method said suspension is maintained in step c) for at least 3 hours at a pH of 10 to 14, a temperature of at least 120° C., and a pressure which is at least 1 bar higher than the applied pressure.

In another preferred embodiment of said method said suspension is brought in step d) to a pH of 5 to 7.

In another preferred embodiment of said method enzymatic treatment in step e) of said suspension comprises the subsequent steps of e1) treating with one or more cell-wall degrading enzymes, and e2) treating with one or more protein degrading enzymes.

In another preferred embodiment of said method further comprises a step of ultrasonic treatment during step c).

In another preferred embodiment of said method the separation is performed by filtration, centrifugation, or a combination thereof.

In another preferred embodiment of said method the suspension obtained in step b) is submitted to a heat shock treatment before being submitted to said pH treatment (3).

In another preferred embodiment of said method heat shock treatment comprises cooling the suspension obtained in step b) to a temperature below 0° C., followed by shock heating the cooled suspension by contact with a hot aqueous solution of at least 70° C.

In another preferred embodiment of said method said aqueous solution is pure water or distilled or double distilled water at a temperature of between 95 and 100 deg C.

In another preferred embodiment of said method said soluble cocoa components are freeze dried, roller dried or spray dried.

In another preferred embodiment the invention relates to a soluble cocoa product obtainable by said method and preferably having a solubility of at least 50%.

In another preferred embodiment the invention relates to a beverage pouch comprising the soluble cocoa product obtainable by said method.

In a second aspect, the invention relates to a method for producing a soluble cocoa product from cocoa powder comprising the steps:
1) Preparing an aqueous suspension of cocoa powder,
2) Treating the suspension with one or more degrading enzymes,
3) Separating the treated suspension into insoluble material and a soluble part,
4) Freezing the insoluble material,
5) Shock heating the frozen insoluble material by contact with hot aqueous solution, to obtain a further treated suspension,
6) Separating the further treated suspension into insoluble material and a soluble part, and
7) Obtaining soluble cocoa components from the soluble parts.

In a preferred embodiment of said method said suspension is prepared by mixing the cocoa powder with a solution comprising salt in a below isotonic concentration.

In another preferred embodiment of said method said suspension is prepared by mixing the cocoa powder with distilled water or double distilled water.

In yet another preferred embodiment of said method said degrading enzymes are any of amylases, polyphenolase, proteases, pentosanases, glucanases, cellulases, carbohydrases, xylanases, pectinases, and alpha-amylase.

In yet another preferred embodiment said method further comprises the step of ultrasonic treatment before, during or after step 2).

In a preferred embodiment of said method the separation is performed by filtration, centrifugation, or a combination thereof.

In yet another preferred embodiment of said method said insoluble material is frozen by placing in a freezer or by contacting with a freezing substance.

In yet another preferred embodiment of said method said hot aqueous solution is at 70 deg C. or above. In another preferred embodiment of said method said aqueous solution is pure water or distilled or double distilled water at 95 and 100 deg C.

The invention further comprises a method which further comprises the steps of: 5a) Treating the further treated suspension with one or more degrading enzymes to obtain a further treated suspension, and 5b) Optionally repeating step 5a) at least once.

The invention also further comprises a method which further comprises the steps of: 5a) Treating the further treated suspension with one or more degrading enzymes, and Repeating at least once, steps 3) to 5a) using the further treated suspension of step 5a). In yet another preferred embodiment of said method said soluble cocoa components are freeze dried, roller dried or spray dried.

The invention also relates to a method for solubilising plant material comprising the steps of:
1) Freezing the plant material,
2) Shock heating the frozen plant material by contact with hot aqueous solution, to obtain a further treated suspension,
3) Separating the further treated suspension into insoluble material and a soluble part and
7) Obtaining soluble plant material from the soluble parts.

The invention further comprises a method wherein the additional conditions or steps as defined above are applied.

The invention further comprises a method as defined above, applied to solubilising plant material.

In another preferred embodiment the invention relates to a soluble cocoa product obtainable by said method.

In another preferred embodiment the invention relates to a beverage pouch comprising the soluble cocoa product obtainable by said method.

In a third aspect, the invention relates to a method combining the methods according to the first and second aspect, mentioned above.

The invention claimed is:
1. A method for producing a soluble cocoa product from cocoa powder comprising the steps:
   a) preparing an aqueous suspension of cocoa powder,
   b) optionally treating said suspension with one or more degrading enzymes,
   c) treating the suspension obtained in step b) for at least 2 hours at a pH of at least 10, a temperature of at least 100° C., and a pressure which is at least 1 bar higher than the ambient pressure, d) optionally bringing the pH of the suspension obtained in step c) to a pH value corresponding with the pH of the suspension obtained in step a), e) treating the suspension obtained in step c) or d) with one or more degrading enzymes, f) separating the suspension obtained in step e) into insoluble material and a soluble part, and g) obtaining soluble cocoa components from the soluble parts.

2. The method according to claim 1, wherein said suspension is prepared by mixing the cocoa powder with a solution comprising salt in a below isotonic concentration.

3. The method according to claim 1, wherein said suspension is prepared by mixing the cocoa powder with distilled water or double distilled water.

4. The method according to claim 1, wherein said suspension is treated in step b) with one or more starch degrading enzymes.

5. The method according to claim 1, wherein the ambient pressure in step c) is initially between 1 and 1.5 bar and is raised during step c) up to a pressure between 2 to 5 bar.

6. The method according to claim 1, wherein said suspension is maintained in step c) for at least 3 hours at a pH of 10 to 14, a temperature of at least 120° C., and a pressure which is at least 1 bar higher than the ambient pressure.

7. The method according to claim 1, wherein said suspension is brought in step d) to a pH of 5 to 7.

8. The method according to claim 1, wherein enzymatic treatment in step e) of said suspension comprises the subsequent steps of:

e1) treating with one or more cell-wall degrading enzymes, and e2) treating with one or more protein degrading enzymes.

9. The method according to claim 1, further comprising a step of ultrasonic treatment during step c).

10. The method according to claim 1, wherein the separation is performed by filtration, decantation, centrifugation, or a combination thereof.

11. The method according to claim 1, wherein the suspension obtained in step b) is submitted to a heat shock treatment before being submitted to said pH treatment.

12. The method according to claim 11, wherein said heat shock treatment comprises cooling the suspension obtained in step b) to a temperature below 0° C., followed by shock heating the cooled suspension by contact with a hot aqueous solution of at least 70° C.

13. The method according to claim 12, wherein said aqueous solution is pure water or distilled or double distilled water at a temperature of between 95 and 100° C.

14. The method according to claim 1, wherein said soluble cocoa components are freeze dried, roller dried or spray dried.

15. The method according to claim 1, further comprising a step of desalting the soluble part obtained in step f).

16. The method according to claim 1, wherein between 50 and 100% of the soluble components of the cocoa suspension of step a) are comprised in the soluble cocoa components of step g).

* * * * *

UNITED STATES PATENT AND TRADEMARK OFFICE
CERTIFICATE OF CORRECTION

PATENT NO.         : 8,372,456 B2                                    Page 1 of 1
APPLICATION NO.    : 12/447420
DATED              : February 12, 2013
INVENTOR(S)        : Bernaert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 800 days.

Signed and Sealed this
First Day of September, 2015

Michelle K. Lee
*Director of the United States Patent and Trademark Office*